(12) United States Patent
Dickson et al.

(10) Patent No.: US 12,475,375 B2
(45) Date of Patent: Nov. 18, 2025

(54) SYSTEMS AND METHODS FOR ASSESSING INFRASTRUCTURE

(71) Applicant: RoadBotics, Inc., Pittsburgh, PA (US)

(72) Inventors: Miguel Dickson, Pittsburgh, PA (US); Benjamin T. Schmidt, Penn Hills, PA (US)

(73) Assignee: Michelin Mobility Intelligence, Inc., Pittsburgh, PA (US)

( * ) Notice: Subject to any disclaimer, the term of this patent is extended or adjusted under 35 U.S.C. 154(b) by 466 days.

(21) Appl. No.: 17/769,304

(22) PCT Filed: Oct. 14, 2020

(86) PCT No.: PCT/US2020/055508
§ 371 (c)(1),
(2) Date: Apr. 14, 2022

(87) PCT Pub. No.: WO2021/076573
PCT Pub. Date: Apr. 22, 2021

(65) Prior Publication Data
US 2023/0306573 A1 Sep. 28, 2023

Related U.S. Application Data

(60) Provisional application No. 62/915,426, filed on Oct. 15, 2019.

(51) Int. Cl.
G06V 10/70 (2022.01)
E01C 23/01 (2006.01)
(Continued)

(52) U.S. Cl.
CPC ............ *G06N 3/082* (2013.01); *E01C 23/01* (2013.01); *G06T 7/0002* (2013.01); *G06V 10/70* (2022.01);
(Continued)

(58) Field of Classification Search
None
See application file for complete search history.

(56) References Cited

U.S. PATENT DOCUMENTS 6,453,056 B2   9/2002  Laumeyer et al.
6,690,294 B1   2/2004  Zierden
(Continued)

FOREIGN PATENT DOCUMENTS

CN   107092020 A   8/2017
CN   109564619 A   4/2019
(Continued)

OTHER PUBLICATIONS

Wu et al., "Coupling Deep Learning and UAV for Infrastructure Condition Assessment Automation", IEEE, 2018 (Year: 2018).*
(Continued)

*Primary Examiner* — Mark R Milia
(74) *Attorney, Agent, or Firm* — Wolf, Greenfield & Sacks, P.C.

(57) ABSTRACT

Systems and methods for assessing infrastructure assets. In some embodiments, sensor data collected from a plurality of infrastructure assets may be analyzed, and an infrastructure asset may be identified as a candidate for a selected type of maintenance. The infrastructure asset may include a road segment, and the sensor data may include an image of a pavement surface along the road segment. One or more machine learning models may be used to identify a portion of the image exhibiting a selected type of damage, such as cracking, chipping, pothole, etc.

25 Claims, 12 Drawing Sheets

(51) Int. Cl.
- *G06N 3/082* (2023.01)
- *G06T 7/00* (2017.01)
- *G06V 10/82* (2022.01)
- *G06V 20/10* (2022.01)
- *G06V 20/56* (2022.01)

(52) U.S. Cl.
CPC .............. *G06V 10/82* (2022.01); *G06V 20/10* (2022.01); *G06V 20/56* (2022.01); *G06T 2207/10016* (2013.01); *G06T 2207/20081* (2013.01); *G06T 2207/30184* (2013.01)

(56) References Cited

U.S. PATENT DOCUMENTS

| | | | |
|---|---|---|---|
| 7,697,727 | B2 | 4/2010 | Xu et al. |
| 9,092,981 | B2 | 7/2015 | Suzuki et al. |
| 9,196,048 | B2 | 11/2015 | Jahanshahi et al. |
| 9,916,755 | B1 | 3/2018 | Ratti |
| 10,147,002 | B2 | 12/2018 | Hartmann et al. |
| 10,296,794 | B2 | 5/2019 | Ratti |
| 11,769,238 | B2 | 9/2023 | Schmidt et al. |
| 2003/0202683 | A1 | 10/2003 | Ma et al. |
| 2007/0127774 | A1 | 6/2007 | Zhang et al. |
| 2011/0234749 | A1 | 9/2011 | Alon |
| 2013/0082857 | A1 | 4/2013 | Beer et al. |
| 2013/0216089 | A1 | 8/2013 | Chen et al. |
| 2014/0196529 | A1 | 7/2014 | Cronin et al. |
| 2016/0292518 | A1 | 10/2016 | Banitt et al. |
| 2017/0032402 | A1 | 2/2017 | Patsiokas et al. |
| 2019/0005685 | A1 | 1/2019 | Mu |
| 2020/0334566 | A1* | 10/2020 | Vianu ............ G06N 3/084 |
| 2023/0196535 | A1 | 6/2023 | Schmidt et al. |
| 2024/0127416 | A1 | 4/2024 | Schmidt et al. |

FOREIGN PATENT DOCUMENTS

| | | |
|---|---|---|
| EP | 3 859 279 A1 | 8/2021 |
| WO | WO 2008/032305 A2 | 3/2008 |

OTHER PUBLICATIONS

Abou Charcra et al., "Fully Automated Road Defect Detection Using Street View Images", IEEE, 14th Conference on Computer and Robot Vision, 2017 (Year: 2017).*

Angulo et al., Road Damage Detection Acquisition System based on Deep Neural Networks for Physical Asset Management, Sep. 2019 (Year: 2019).*

International Search Report and Written Opinion for International Application No. PCT/US2020/055508, mailed Jan. 21, 2021.

Third Party Observation for International Application No. PCT/US2020/055508, submitted Feb. 14, 2022.

International Preliminary Report on Patentability for International Application No. PCT/US2020/055508, mailed Apr. 28, 2022.

Invitation to Pay Additional Fees for International Application No. PCT/US2021/032820, mailed Jul. 15, 2021.

International Search Report and Written Opinion for International Application No. PCT/US2021/032820, mailed Oct. 7, 2021.

[No Author Listed] Designation: D 6433-07. Standard practice for roads and parking lots pavement condition index surveys. ASTM International. https://pages.mtu.edu/~balkire/CE5403/ASTMD6433.pdf. Jan. 2008: 1-48.

[No Author Listed] Scale-invariant feature transform. Wikipedia. https://en.wikipedia.org/wiki/Scale-invariant_feature_transform. Downloaded Mar. 12, 2020:1-19.

[No Author Listed] Structure from motion. Wikipedia. https://en.wikipedia.org/wiki/Structure_from_Motion. Downloaded Mar. 12, 2020:1-9.

Berger et al., State of the art in surface reconstruction from point clouds. Eurographics 2014 State of the Art Reports (STAR). Apr. 7, 2014;1(1):161-85.

Bruls et al., Mark yourself: Road marking segmentation via weakly-supervised annotations from multimodal data. 2018 IEEE International Conference on Robotics and Automation (ICRA). May 21-25, 2018:1863-70.

Kudinov et al., Object extraction from Mobile LiDAR point clouds with Machine Learning. Medium GeoAI. https://medium.com/geoai/object-extraction-from-mobile-lidar-point-clouds-with-machine-learning-cb15fcbb5597. Jan. 27, 2020:1-43.

Li et al., Efficient dense point cloud object reconstruction using deformation vector fields. Proceedings of the European Conference on Computer Vision (ECCV). Sep. 8-14, 2018:497-513.

Mandikal et al., 3d-psrnet: Part segmented 3d point cloud reconstruction from a single image. Proceedings of the European Conference on Computer Vision (ECCV) Workshops Sep. 8-14, 2018:1-13.

Moulon et al., Global fusion of relative motions for robust, accurate and scalable structure from motion. Proceedings of the IEEE International Conference on Computer Vision (ICCV). Dec. 1-8, 2013:3248-55.

Napier, Vision & laser for road based localisation. Robotics Research Group, Department of Engineering Science, University of Oxford. https://www.robots.ox.ac.uk/~mobile/Theses/Napier_Thesis_shrunk.pdf. Jan. 2014:1-190.

Trigilio, Structure from motion (SfM). Humboldt State Geospatial Online GSP 216: Introduction to Remote Sensing. gsp.humboldt.edu/OLM/Courses/GSP_216_Online/lesson8-2/SfM.html. Dated 2017; Downloaded Mar. 12, 2020:1-6.

Zhou et al., Detail preserved surface reconstruction from point cloud. Sensors. Mar. 13, 2019;19(6):1278.

Sheehan et al., Continuous vehicle localisation using sparse 3D sensing, kernelised Rényi distance and fast Gauss transforms. 2013 IEEE/RSJ International Conference on Intelligent Robots and Systems (IROS). Nov. 3, 2013:398-405.

Yuan et al., Robust lane detection for complicated road environment based on normal map. IEEE Access. Sep. 6, 2018;6:49679-89.

U.S. Appl. No. 17/925,958, filed Nov. 17, 2022, Schmidt et al.

PCT/US2021/032820, Sep. 18, 2022, Third Party Observation.

PCT/US2021/032820, Dec. 1, 2022, International Preliminary Report on Patentability.

Third Party Observation for International Application No. PCT/US2021/032820, submitted Sep. 18, 2022.

International Preliminary Report on Patentability for International Application No. PCT/US2021/032820, mailed Dec. 1, 2022.

Guan et al., Iterative tensor voting for pavement crack extraction using mobile laser scanning data. IEEE Transactions on Geoscience and Remote Sensing. Sep. 4, 2014;53(3):1527-37.

* cited by examiner

SYSTEMS AND METHODS FOR ASSESSING INFRASTRUCTURE

RELATED APPLICATION

This application is a national stage filing under 35 U.S.C. § 371 of International Patent Application Serial No. PCT/US2020/055508, filed Oct. 14, 2020, entitled "SYSTEMS AND METHODS FOR ASSESSING INFRASTRUCTURE", which claims priority benefit under 35 U.S.C. § 119 (e) to U.S. Provisional Application No. 62/915,426, filed on Oct. 15, 2019, entitled "SYSTEMS AND METHODS FOR ASSESSING INFRASTRUCTURE," bearing. The contents of these applications are, incorporated herein by reference in their entireties.

BACKGROUND

Reliable infrastructure (e.g., transportation, telecommunication, energy, water, etc.) is vital to every country's economy. Both public entities (e.g., federal, state, and municipal governments) and private entities (e.g., utility companies) invest enormous amounts of resources to build and maintain infrastructure assets such as roads, railways, bridges, canals, airports, pipelines, cables, etc.

SUMMARY

In accordance with some embodiments, a method is provided, comprising acts of: analyzing sensor data collected from a plurality of infrastructure assets; and identifying, based at least in part on the sensor data, at least one infrastructure asset from the plurality of infrastructure assets as a candidate for a selected type of maintenance.

In some embodiments, the sensor data comprises an image of the at least one infrastructure asset, and analyzing the sensor data comprises using at least one machine learning model to identify, from the image, at least one image portion exhibiting a selected type of damage.

In some embodiments, the at least one infrastructure asset comprises at least one road segment, the sensor data comprises a plurality of images taken along the at least one road segment, the plurality of images comprise a first image, analyzing the sensor data comprises using a first machine learning model to identify, from the first image, at least one image portion exhibiting a selected type of damage, and the method further comprises an act of using a second machine learning model to predict a human assessment of the first image, based on at least one actual human assessment of at least one second image of the plurality of images.

In accordance with some embodiments, a system is provided, comprising at least one processor and at least one computer-readable storage medium having stored thereon instructions which, when executed, program the at least one processor to perform any of the methods described herein.

In accordance with some embodiments, at least one computer-readable storage medium is provided, having stored thereon instructions which, when executed, program at least one processor to perform any of the methods described herein.

DETAILED DESCRIPTION

Figure 1A:
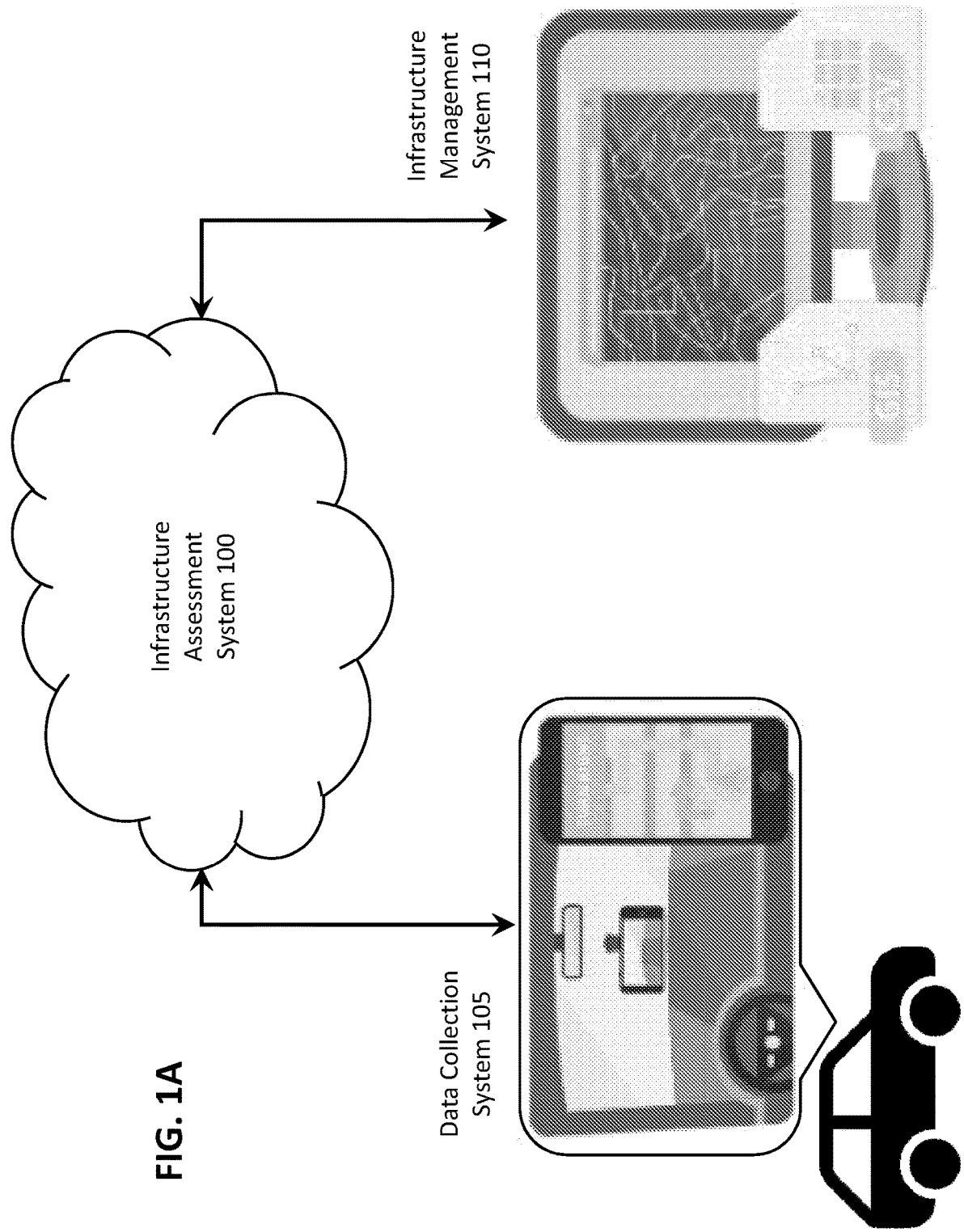
FIG. 1A shows an illustrative infrastructure assessment system 100, in accordance with some embodiments.

The sheer scale and geographic extent of infrastructure assets lead to challenges in monitoring and maintenance. For instance, there are currently about 25 million miles of paved roads worldwide, with about 4 million miles in the US alone. Many municipalities send out human crews to visually inspect all roads, which is a time-consuming and subjective process. Moreover, decisions on which road segments to repair and what repair methods to use are often made in an ad-hoc manner, which may lead to inefficient deployment of resources.

Accordingly, in some embodiments, one or more machine learning techniques may be provided for assessing infrastructure. For instance, a machine learning model may be provided that analyzes sensor data collected from infrastructure assets, and outputs corresponding assessments. Such a machine learning model may be trained using sensor data that has been labeled by human inspectors. In this manner, the machine learning model may learn the human inspectors' judgments, and may output assessments similar to those made by the human inspectors.

In some embodiments, a deep learning architecture may be used to extract features from input data, and to make assessments based on the extracted features. For instance, the deep learning architecture may include a plurality of layers arranged in a sequence. Each layer may be configured to produce a composite representation of its input, and may output the composite representation to a next layer. High level features extracted by such a sequence of layers may be provided as input to a classification layer, which may in turn output an assessment. Through training, the feature extraction layers may learn to extract progressively higher level features that are relevant for assessment, while the classification layer may learn to output assessments similar to those made by human inspectors who labeled the input data.

The inventors have recognized and appreciated that, while infrastructure assessment may provide useful insights to relevant stakeholders (e.g., owners and/or operators of infrastructure assets), such insights may not be immediately actionable. For instance, assessments of paved roads in a municipality may include numerical scores assigned to respective road segments. While these scores may inform municipal officials of conditions of the roads, the officials may still devise a maintenance plan manually. For instance, the officials may manually determine which road segments may be too badly damaged to be effectively repaired (and should instead be torn up and reconstructed), and which road segments may be repaired in a relatively inexpensive manner. Such an ad-hoc decision making process may lead to inefficient deployment of resources (e.g., repeated repairs that fail to sustain satisfactory conditions).

Accordingly, in some embodiments, one or more machine learning techniques may be provided for identifying maintenance candidates. For instance, a machine learning model may be provided that analyzes sensor data collected from infrastructure assets, and outputs one or more candidates for a selected type of maintenance (e.g., reparative and/or preventive maintenance). Additionally, or alternatively, the machine learning model may output one or more images and/or portions of images that are identified as having a selected characteristic (e.g., exhibiting a selected type of damage), for example, to explain why the selected type of maintenance is recommended. Such a machine learning model may be trained using sensor data that has been labeled by human decision makers. In this manner, the machine learning model may learn the human decision makers' judgments, and may output candidates similar to those identified by the human decision makers.

It should be appreciated that aspects of the present disclosure are not limited to using a supervised learning technique, or any machine learning technique at all. In some embodiments, one or more unsupervised learning techniques may be used in addition to, or instead of, one or more supervised learning techniques.

It should also be appreciated that the techniques introduced above and/or discussed in detail below may be implemented in any of numerous ways, as these techniques are not limited to any particular manner of implementation. Examples of implementation details are provided herein solely for purposes of illustration. Furthermore, the techniques disclosed herein may be used individually or in any suitable combination, as aspects of the present disclosure are not limited to any particular technique or combination of techniques.

FIG. 1A shows an illustrative infrastructure assessment system 100, in accordance with some embodiments. In this example, the infrastructure assessment system 100 is configured to receive sensor data from a data collection system 105, and to provide assessment outputs to an infrastructure management system 110.

The data collection system 105 may collect sensor data from infrastructure assets of any suitable type, such as paved roads, traffic signs, fire hydrants, manholes, utility poles, fences, cables, pipelines, etc. Such a data collection system may be deployed in a number of different ways. For instance, the data collection system 105 may include one or more sensors (e.g., a camera) carried by a vehicle, such as a land vehicle (e.g., a car), an aerial vehicle (e.g., a drone), a water vehicle (e.g., a boat), etc. Additionally, or alternatively, the data collection system 105 may include one or more sensors attached to a structure suitably located to allow monitoring of one or more infrastructure assets. Additionally, or alternatively, the data collection system 105 may include one or more sensors attached to an infrastructure asset itself.

A sensor may be attached to a vehicle or a structure in any suitable manner. For example, the inventors have recognized and appreciated that integrated cameras on mobile devices such as smartphones may be used to capture images of infrastructure assets. Accordingly, in some embodiments, the data collection system 105 may include a mobile device mounted on a dashboard or a windshield of a car. As the car drives on selected roads, an integrated camera of the mobile device may capture images of pavement surfaces, traffic signs, fire hydrants, manholes, utility poles, etc.

In some embodiments, one or more network interfaces of the mobile device may be used to transmit collected data to the infrastructure assessment system 100. The one or more network interfaces may implement one or more networking technologies, such as 5G, LTE, WiMAX, WiFi, Ethernet, Bluetooth, etc. The one or more networking technologies may allow the collected data to be transmitted in real time (e.g., while a data collection trip is still in progress). This may in turn allow the infrastructure assessment system 100 to process the collected data and provide feedback to the data collection system 105 in real time.

For instance, the infrastructure assessment system 100 may check quality of the collected data (e.g., sharpness, brightness, and/or other quality measures of images). If the collected data is deemed undesirable in one or more aspects, the infrastructure assessment system 100 may send a request to the data collection system 105 to adjust one or more data collection parameters (e.g., focus, image resolution, color depth, etc.). Additionally, or alternatively, the infrastructure assessment system 100 may request that the data collection system 105 repeat one or more data collection tasks (e.g., driving over one or more road segments already traversed to acquire higher quality images).

In some embodiments, the data collection system 105 may include an app running on the mobile device. This app may be programmed to adjust one or more data collection parameters in response to a request from the infrastructure assessment system 100. Additionally, or alternatively, the app may be programmed to perform one or more quality checks locally, and may adjust one or more data collection parameters accordingly.

In some embodiments, the app running on the mobile device may be programmed to provide a user interface. For instance, the app may be programmed to display, to a human operator, one or more instructions regarding a data collection task. The one or more instructions may be received from the infrastructure assessment system 100, and/or generated locally by the data collection system 105.

As an example, the data collection system 105 may include a camera attached to a vehicle, and the data collection task may include driving over a selected set of road segments to collect images of pavement surfaces. The infrastructure assessment system 100 and/or the data collection system 105 may be programmed to determine a suitable route for the vehicle to cover the selected set of road segments. The app may be programmed to display, based on the determined route, turn-by-turn instructions to a human operator of the vehicle.

It should be appreciated that aspects of the present disclosure are not limited to using a human-operated vehicle, or any vehicle at all, to collect data from infrastructure assets. In some embodiments, an autonomous vehicle may be used instead of, or in addition to, a human-operated vehicle. The data collection system 105 may be programmed to provide, to the autonomous vehicle, the determined route and/or one or more real time updates (e.g., returning to one or more road segments already traversed to acquire higher quality images).

In some embodiments, the app running on the mobile device may be programmed to process raw sensor data, and the processed data may be transmitted to the infrastructure assessment system 100 instead of, or in addition to, the raw sensor data. As one example, the raw sensor data may include a video stream. The app may be programmed to downsample the video stream, so that less bandwidth may be used for transmitting data to the infrastructure assessment system 100. In some embodiments, the app may be programmed to use timestamps associated the video stream, in combination with GPS and/or accelerometer data, to tag one or more image frames in the video stream with location data. This may in turn allow the app to downsample the video stream based on location, for example, into a sequence of image frames at regular distance intervals (e.g., one frame per meter, per 2 meters, per 3 meters, per 4 meters, per 5 meters, etc.).

As another example, the app running on the mobile device may be programmed to perform one or more types of feature extraction. For instance, the app may perform edge detection on one or more image frames, and may transmit a representation of one or more detected edges to the infrastructure assessment system 100, instead of, or in addition to, the one or more image frames. Additionally, or alternatively, the app may detect one or more objects (e.g., a pavement surface, a traffic sign, a fire hydrant, a manhole, a utility pole, etc.) from one or more image frames, and may transmit one or more corresponding image portions to the infrastructure assessment system 100, instead of, or in addition to, the one or more image frames.

The inventors have recognized and appreciated that performing feature extraction prior to downsampling may improve accuracy. However, it should be appreciated that aspects of the present disclosure are not limited to using any particular technique or combination of techniques, or any technique at all, to reduce bandwidth for transmitting data to the infrastructure assessment system 100.

Although the inventors have recognized and appreciated various benefits of using a mobile device such as a smartphone to collect, process, and/or transmit data, it should be appreciated that aspects of the present disclosure are not so limited. In some embodiments, one or more sensors may be integrated into a vehicle (e.g., a drone). Additionally, or alternatively, data collected by the one or more sensors may be stored in a memory integrated into the vehicle, and/or transmitted to the infrastructure assessment system 100 via a network interface integrated into the vehicle. Additionally, or alternatively, any one or more of the data processing functionalities described above may be performed by one or more processors integrated into the vehicle.

It should also be appreciated that aspects of the present disclosure are not limited to acquiring visible light images from infrastructure assets. In some embodiments, one or more other sensing techniques (e.g., based on infrared radiation, X ray, lidar, radar, ultrasound, electric current, magnetic field, etc.) may be used in addition to, or instead of, visible light imaging.

Returning to the example of FIG. 1A, the infrastructure assessment system 100 may provide assessment outputs to the infrastructure management system 110 in any suitable manner. For instance, the infrastructure management system 110 may, in some embodiments, include a web browser configured to render a user interface based on data and/or one or more scripts received from the infrastructure management system 110. Additionally, or alternatively, the infrastructure management system 110 may include user interface software programmed to display data received from the infrastructure management system 110. The received data may be in any suitable form, such as a geographic information system (GIS) file, a comma separated values (CSV) file, etc. A GIS file may be in any suitable format, such as shapefile, GeoJSON, Keyhole Markup Language (KML), etc.

Figure 1B:
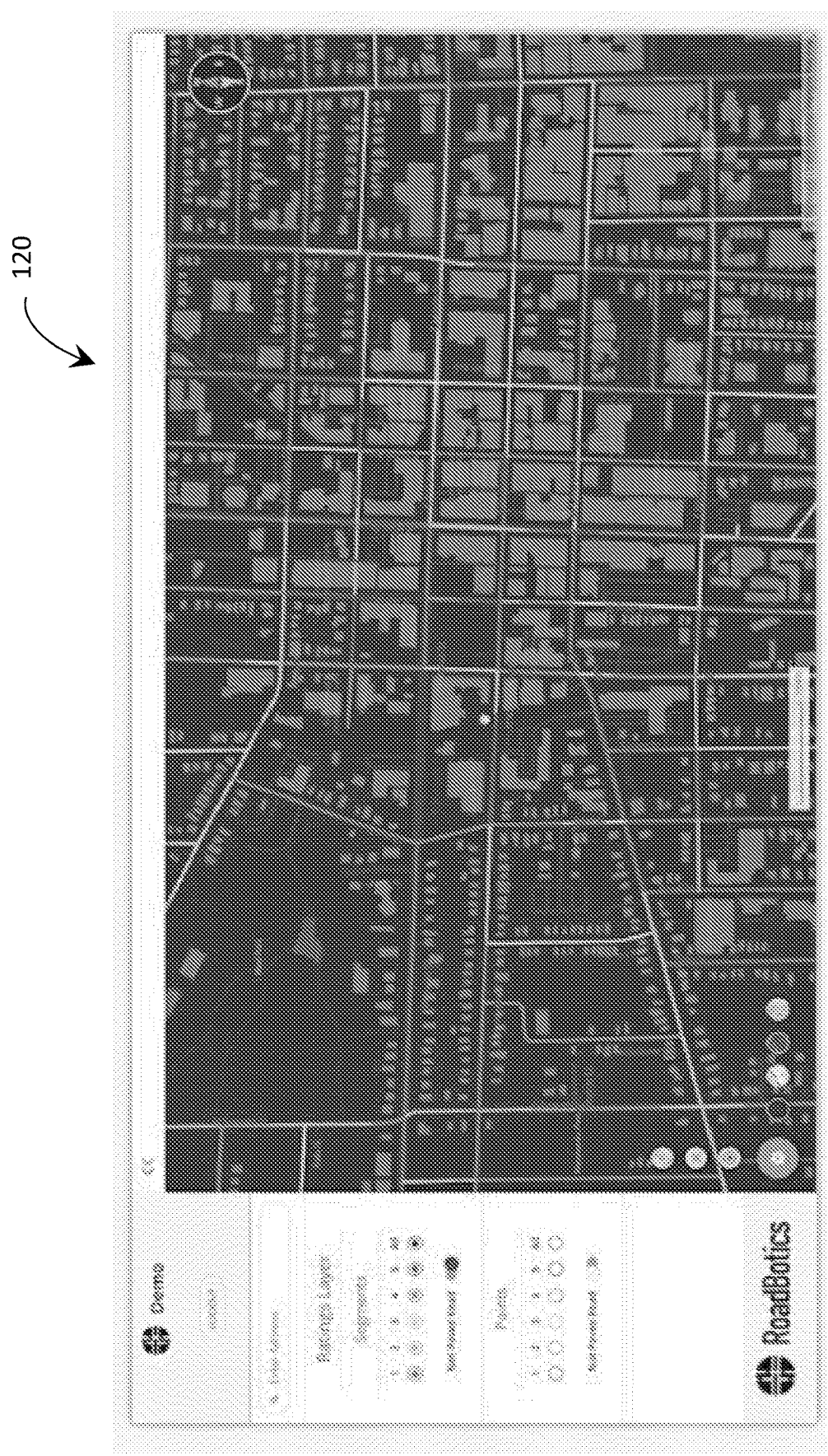
FIG. 1B shows an illustrative user interface 120, in accordance with some embodiments.

In some embodiments, a user interface of the infrastructure management system 110 may display a map of one or more infrastructure assets, along with one or more respective visual indications adapted to convey information about the one or more infrastructure assets. FIG. 1B shows an illustrative user interface 120, in accordance with some embodiments. In this example, the infrastructure assessment system 100 assigns an assessment score to an infrastructure asset (e.g., a road segment, a stop sign, etc.). The infrastructure management system 110 may display the infrastructure asset in a selected color corresponding to the assessment score, such as dark green for 1 (e.g., good condition), light green for 2 (e.g., minor damage), yellow for 3 (e.g., moderate damage), orange for 4 (e.g., significant damage), red for 5 (e.g., severe damage), etc. However, it should be appreciated that aspects of the present disclosure are not limited to using any particular scoring or color coding scheme, or any scoring or color coding scheme at all.

In some embodiments, a user interface of the infrastructure management system 110 may allow a user to filter infrastructure assets to be displayed on a map. For instance, in the example of FIG. 1B, the infrastructure management system 110 allows the user to filter based on assessment score (e.g., all road segments assigned a score of 5, all road segments assigned a score of 4 or higher, etc.). As another example, the infrastructure management system 110 may allow the user to filter based on recommended maintenance type (e.g., all road segments with lane markers that should be reapplied, all fire hydrants that should be repainted, all stop signs obscured by vegetation that should be removed, etc.).

In some embodiments, a user interface of the infrastructure management system 110 may allow a user to call up information associated with an infrastructure asset. For instance, the infrastructure asset may be represented by one or more clickable icons. In response to the user clicking on an icon, the user interface may display an image of the infrastructure asset, an assessment score, a recommended type of maintenance, and/or any other suitable information.

Figure 1C:
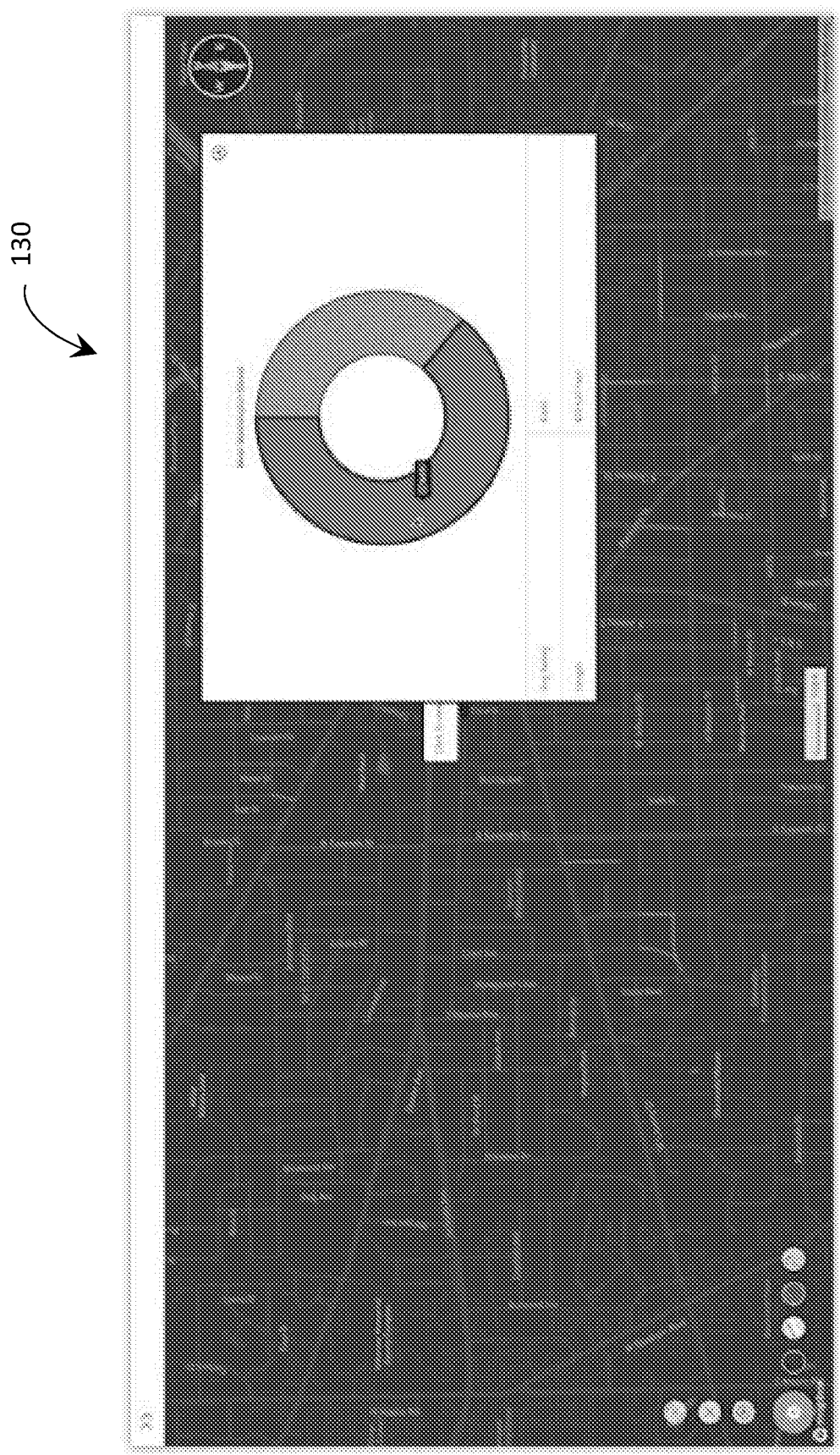
FIG. 1C shows an illustrative user interface 130, in accordance with some embodiments.

FIG. 1C shows an illustrative user interface 130, in accordance with some embodiments. In this example, an assessment score is shown in response to a user clicking on a road segment, along with a breakdown of scores assigned to images collected along the road segment.

Figure 1D:
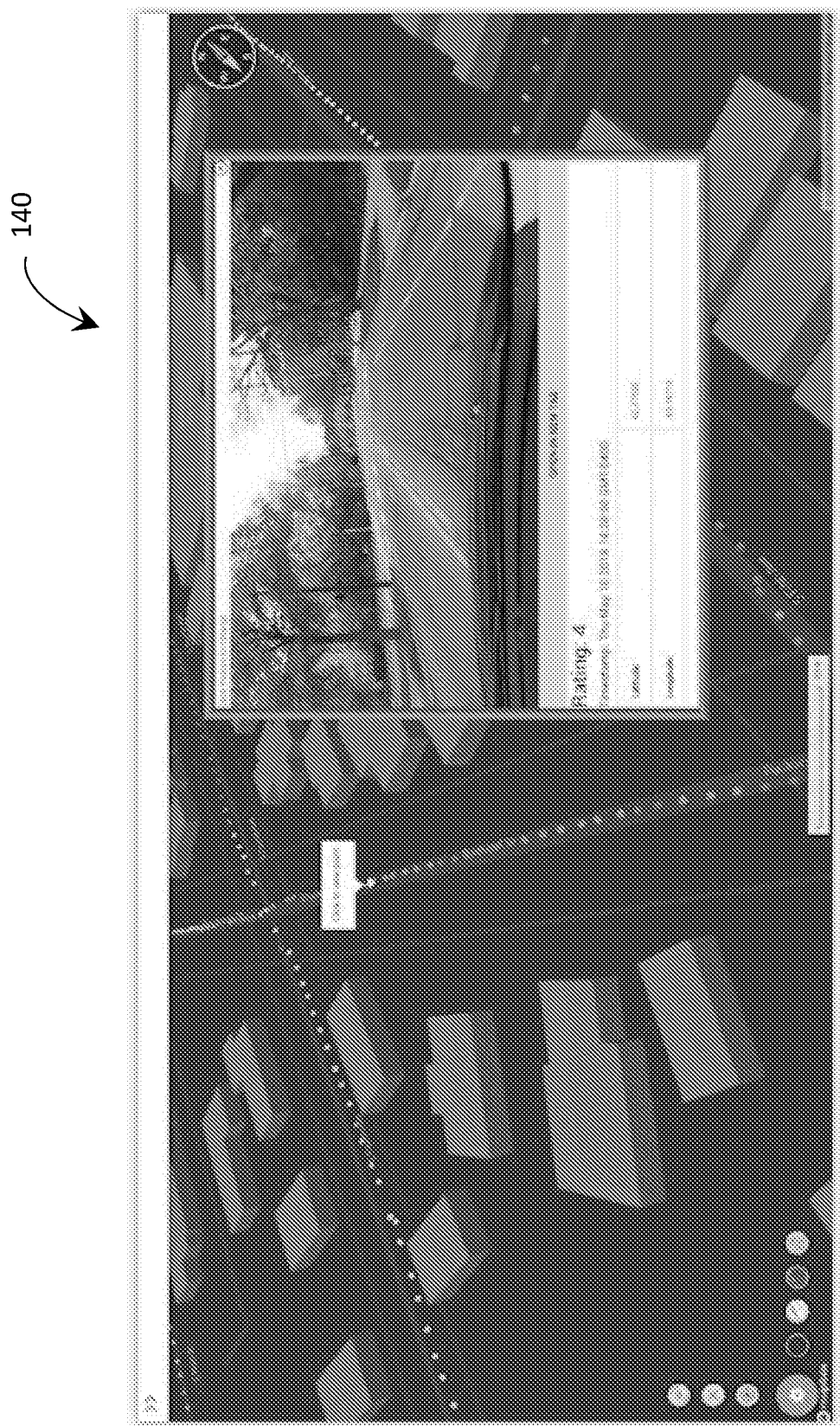
FIG. 1D shows an illustrative user interface 140, in accordance with some embodiments.

FIG. 1D shows an illustrative user interface 140, in accordance with some embodiments. In this example, a road segment is shown with a plurality of clickable dots corresponding, respectively, to a plurality of regularly spaced locations along the road segment (e.g., one dot per meter, per 2 meters, per 3 meters, per 4 meters, per 5 meters, etc.). In response to a user clicking on a dot, the user interface 140 may display an image collected at the corresponding location, an associated assessment score, a timestamp for the image, and/or GPS coordinates associated with the image.

Figure 2:
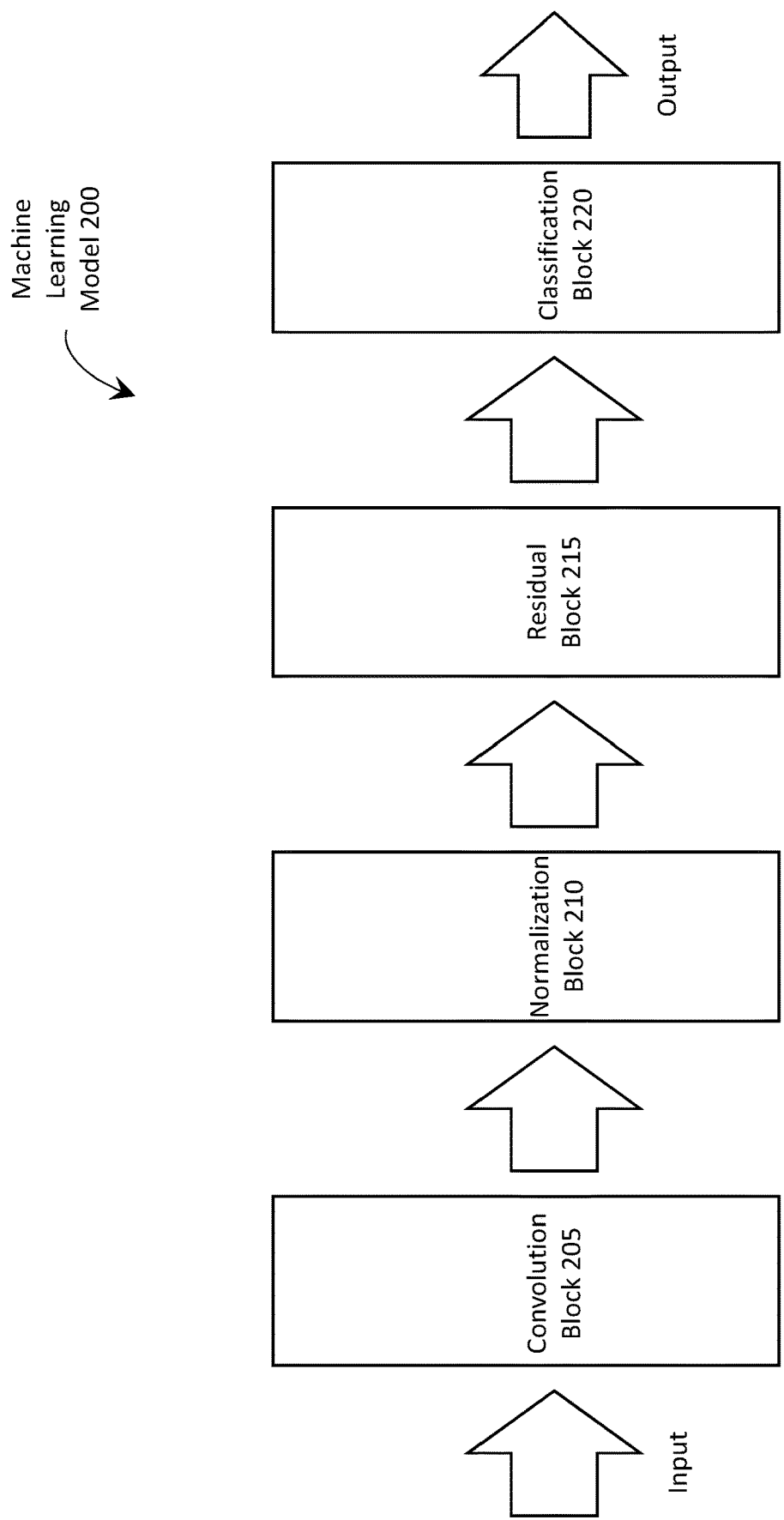
FIG. 2 shows an illustrative machine learning model 200, in accordance with some embodiments.

FIG. 2 shows an illustrative machine learning model 200, in accordance with some embodiments. For instance, the machine learning model 200 may be used by the illustrative infrastructure assessment system 100 in the example of FIG. 1A to analyze sensor data collected from infrastructure assets, and to output corresponding assessments.

In some embodiments, the machine learning model 200 may receive, as input, an image of an infrastructure asset. The image may be of any suitable size (e.g., 1024×1920 pixels), and may have any suitable number of one or more channels (e.g., greyscale, RGB, HSL, HSV, HSI, CMYK, or another suitable color model). However, it should be appreciated that aspects of the present disclosure are not limited to analyzing images of infrastructure assets. In some embodiments, the machine learning model 200 may be adapted to analyze non-image inputs in addition to, or instead of, images. Example of non-image input include, but are not limited to, prior assessments, electromagnetic testing data (e.g., eddy current testing data), weather data, traffic data, etc.

In some embodiments, the machine learning model 200 may output an assessment corresponding to an input. For instance, the machine learning model 200 may output a numerical score (e.g., an integer from 1 to 5) indicative of a condition of an infrastructure asset to which the input pertains. However, it should be appreciated that aspects of the present disclosure are not limited to assigning numerical scores to infrastructure assets. Additionally, or alternatively, the machine learning model 200 may be adapted to output a confidence interval of a numerical score, a probability of a significant change in condition in a given time period, etc.

In some embodiments, the machine learning model 200 may include one or more blocks, where each block may include one or more processing layers. For instance, the machine learning model 200 may include a convolution block 205, a normalization block 210, a residual block 215, and/or a classification block 220. In the example of FIG. 2, these blocks are arranged in a sequence to perform processing in a certain order. However, it should be appreciated that aspects of the present disclosure are not limited to having any particular block or combination of blocks, or to any particular arrangement of blocks. In some embodiments, there may be one or more convolution blocks, one or more normalization blocks, one or more residual blocks, and/or one or more classification blocks arranged in any suitable manner.

In some embodiments, the convolution block 205 may include one or more convolution layers (not shown in FIG. 2), where each convolution layer may be configured to produce a composite representation of its input. For instance, a convolution layer may have an associated kernel (also referred to as a filter), and may use the kernel perform a convolution operation on the input (e.g., an image) to produce a higher level representation of the input (e.g., a set of one or more edges in the image).

In some embodiments, the convolution block 205 may include a plurality of convolution layers arranged in a sequence, so that an output of a convolution layer may be provided as input to a next convolution layer, with or without intermediate processing. This may allow the convolution block 205 to extract progressively higher level features. The plurality of convolution layers may use a same kernel, or different kernels.

In some embodiments, the normalization block 210 may be configured normalize one or more inputs. For instance, the normalization block 210 may normalize an input based on a mean and/or a variance associated with that input, thereby producing an output with zero mean and/or unit variance. In some embodiments, the input may have multiple dimensions, and the normalization block 210 may perform normalization for the multiple dimensions separately, based on respective means and/or variances. In some embodiments, multiple inputs (e.g., from multiple training samples and/or multiple inference samples) may be batched. A mean and/or a variance may be determined for the batch, and may be used to normalize the inputs in the batch.

The inventors have recognized and appreciated that normalization may reduce vanishing and/or exploding gradients, which may in turn allow a deeper architecture (e.g., more layers) to be implemented more effectively. However, it should be appreciated that aspects of the present disclosure are not limited to using a normalization block.

In some embodiments, the residual block 215 may be configured to allow one or more layers within the residual block 215 to be skipped. For instance, the residual block 215 may include an addition layer configured to add an input to the residual block 215 to an output of one or more other layers within the residual block 215. In this manner, the one or more other layers may be skipped during early training, which may allow more efficient exploration of a feature space. However, it should be appreciated that aspects of the present disclosure are not limited to using a residual block.

In some embodiments, the classification block 220 may include one or more fully connected layers configured to output an assessment corresponding to an input received by the machine learning model 200. For instance, the classification block 220 may include a neural network such as a multilayer perceptron (MLP) with a suitable activation function such as sigmoid, rectified linear unit (ReLU), etc. One or more weights in the MLP may be trained using labeled inputs, so that the MLP may output assessments similar to those made by human inspectors who labeled the inputs. Any suitable training technique may be used, including, but not limited to, stochastic gradient descent (e.g., via back-propagation), Newton, conjugate gradient, quasi-Newton, and/or Levenberg-Marquardt.

In some embodiments, one or more machine learning techniques may be used to detect, from an image, one or more regions of interest (e.g., pavement surfaces). For instance, a machine learning model may be provided that analyzes an input image, and outputs one or more detected regions. Such a machine learning model may be referred to herein as a detection model.

In some embodiments, a detected region may be provided as input to another machine learning model, which may analyze the detected region, and output a classification label. Such a machine learning model may be referred to herein as a classification model.

In some embodiments, a classification model may output a label indicative of a type of damage. Examples of such classification labels include, but are not limited to, cracking, chipping, pothole, etc. Additionally, or alternatively, a classification model may output a label indicative of a subtype within a damage type (e.g., longitudinal or transverse cracking).

It should also be appreciated that aspects of the present disclosure are not limited to using separate models for detection and classification. In some embodiments, a single model may be used that outputs a detected region along with a classification label. For instance, a model may be used that analyzes an input image, and outputs one or more detected regions along with one or more respective classification labels.

In some embodiments, detection and classification may be performed using a combination of different machine learning techniques. For instance, a model may be used that analyzes an input image, and outputs one or more detected regions along with one or more respective classification labels indicative of a damage type (e.g., cracking, chipping, pothole, etc.). A detected region of a selected type (e.g., cracking) may be further analyzed to output a subtype classification (e.g., longitudinal or transverse).

In some embodiments, a machine learning model may be provided to detect, from an image, a set of pixels that is likely to represent an infrastructure asset of a certain type and/or a certain subtype. Such a machine learning model may be referred to herein as a segmentation model. For instance, a segmentation model may analyze an input image, and output one or more detected infrastructure assets by labeling one or more sets of pixels in the input image (e.g., "pavement," "stop_sign," "utility_pole," etc.).

Additionally, or alternatively, a segmentation model may be provided to detect, from an image, a set of pixels that is likely to represent a portion of an infrastructure asset exhibiting a certain damage type and/or a certain damage subtype. For instance, a segmentation model may analyze an input image, and output one or more detected pavement surfaces by labeling one or more sets of pixels in the input image as exhibiting, respectively, one or more damage types and/or one or more damage subtypes (e.g., "longitudinal_cracking_0," "longitudinal_cracking_1," etc., "transverse_cracking_0," "transverse_cracking_1," etc., "pothole_0," "pothole_1," etc.).

In some embodiments, a machine learning model may be provided to produce an assessment of an infrastructure asset. Such a machine learning model may be referred to herein as an assessment model. For instance, an assessment model may analyze an input image, and output a numerical score or some other suitable label (e.g., 1 for good condition, 2 for minor damage, 3 for moderate damage, 4 for significant damage, 5 for severe damage, etc.).

A detection, classification, segmentation, or assessment model may be implemented in any suitable manner. For example, a detection, classification, segmentation, or assessment model may include a convolutional neural network (CNN), which may be trained using images that have been labeled by humans. An illustrative CNN architecture is shown in FIG. 2 and described above. However, it should be appreciated that aspects of the present disclosure are not limited to using any particular type of machine learning model, or any machine learning model at all, to detect regions of interest, to classify detected regions, to detect a set of pixels of interest, or to produce an assessment of an infrastructure asset.

The inventors have recognized and appreciated that it may be advantageous to use similar machine learning architectures to detect regions of interest, to classify detected regions, to detect a set of pixels of interest, and/or to produce an assessment of an infrastructure asset. For instance, weights trained for detection may be used to speed up training and/or improve accuracy for classification, segmentation, and/or assessment. Additionally, or alternatively, weights trained for classification may be used to speed up training and/or improve accuracy for detection, segmentation, and/or assessment. Additionally, or alternatively, weights trained for segmentation may be used to speed up training and/or improve accuracy for detection, classification, and/or assessment. Additionally, or alternatively, weights trained for assessment may be used to speed up training and/or improve accuracy for detection, classification, and/or segmentation. However, it should be appreciated that aspects of the present disclosure are not limited to using transferred weights to train a machine learning model.

While various implementation details are shown in FIGS. 1A-D, 2 and described above, it should be appreciated that such details are provided herein solely for purposes of illustration. For instance, aspects of the present disclosure are not limited to having three systems for data collection, assessment, and management, respectively. Any functionality or combination of functionalities described herein may be performed by a single system, or distributed in any suitable manner across two or more systems. The inventors have recognized and appreciated that effective monitoring of infrastructure assets may allow owners and/or operators of infrastructure assets to perform maintenance tasks opportunistically. For instance, the inventors have recognized and appreciated that cost effectiveness of a maintenance task may depend on a condition of an infrastructure asset on which the maintenance task is performed. If the maintenance task is performed too early (e.g., when the infrastructure asset has experienced only minor damage), any gain in the infrastructure asset's life span may be marginal, and may be outweighed by costs associated with the maintenance task. On the other hand, if the maintenance task is performed too late (e.g., when the infrastructure asset has experienced severe damage), the maintenance task may fail to meaningfully extend the infrastructure asset's effective life, and therefore may also be wasteful.

As an example, the largest category of infrastructure expenditure in the U.S. is roads. Many initiatives have been undertaken to improve cost effectiveness of such expenditures. For instance, instead of constructing roads, waiting for their complete degeneration, and then reconstructing, it may be more cost effective to perform preventive maintenance (e.g., pavement preservation) in a timely manner.

A variety of causes (e.g., weather, traffic, etc.) may lead to cracks developing on road surfaces. Such a crack may become a locus of further damage, for example, when water seeps into the crack and freezes. Thus, it may be desirable to identify cracks and seal them before further damage occurs.

However, crack sealing has not been widely adopted, in large part due to challenges in identifying road segments for which crack sealing may be a cost effective intervention. On one hand, if a road segment has suffered only minor damage, performing crack sealing may extend the road segment's expected lifespan only marginally (e.g., from 9 years to 10 years). This may not be sufficient to justify costs associated with the crack sealing operation (e.g., labor and/or material costs). On the other hand, if a road segment has already suffered severe damage, the road segment may fail again in a short time (e.g., 1 to 2 years) or immediately after crack sealing is performed. Again, the costs associated with crack sealing may not be justified. Indeed, in this case, the costs may be even higher, because more material may be needed to fill the numerous, wide, and/or deep cracks on the road segment.

The inventors have recognized and appreciated that, while it may seem straightforward in principle to determine whether an individual road segment is a good candidate for crack sealing, it may be challenging in practice to make such determinations consistently across a large number of road segments (e.g., over an entire city, county, state, etc.). For instance, sending out human crews to identify good candidates may be time consuming, and may result in inconsistent recommendations due to variability in subjective judgments.

Moreover, the inventors have recognized and appreciated that it may be challenging to prioritize road segments for crack sealing. As an example, even though a first road segment may have fewer cracks than a second road segment, the first road segment may experience higher traffic volume and/or heavier vehicles than the second road segment, and therefore may deteriorate more quickly if the cracks are not sealed. As another example, a first road segment may be located near a plurality of second road segments that are good candidates for crack sealing. If a crew will be sent out to perform crack sealing on the second road segments anyway, incremental costs associated with performing crack sealing on the first road segment may be small. As a result, the first road segment may be prioritized over a third road segment with comparable damage but not located near sufficiently many good candidates for crack sealing.

Accordingly, in some embodiments, techniques are provided for identifying infrastructure assets as candidates for a selected type of maintenance. For instance, assessments based on sensor data collected from infrastructure assets may be used to filter out infrastructure assets that are not sufficiently damaged and/or infrastructure assets that are too heavily damaged. One or more criteria for determining whether an infrastructure asset is sufficiently damaged may be chosen based the type of maintenance in question, and likewise for one or more criteria for determining whether an infrastructure asset is too heavily damaged.

In some embodiments, a machine learning model may be provided that analyzes sensor data collected from infrastructure assets, and classifies the infrastructure assets with respect to a selected type of maintenance. For example, the machine learning model may output a classification label indicating that the selected type of maintenance has already been performed on an infrastructure asset. Additionally, or alternatively, the machine learning model may output a classification label indicating that an infrastructure asset exhibits an insufficient number of instances of damage that may be addressed effectively by the selected type of maintenance.

In some embodiments, a plurality of candidates that are in geospatial proximity to each other may be prioritized because the selected type of repair may be performed on such candidates in one or more consecutive work sessions, thereby reducing overhead. Additionally, or alternatively, traffic volume data and/or traffic type data (e.g., residential vs. commercial) may be used to prioritize candidates that are more likely to deteriorate quickly.

Figure 3:
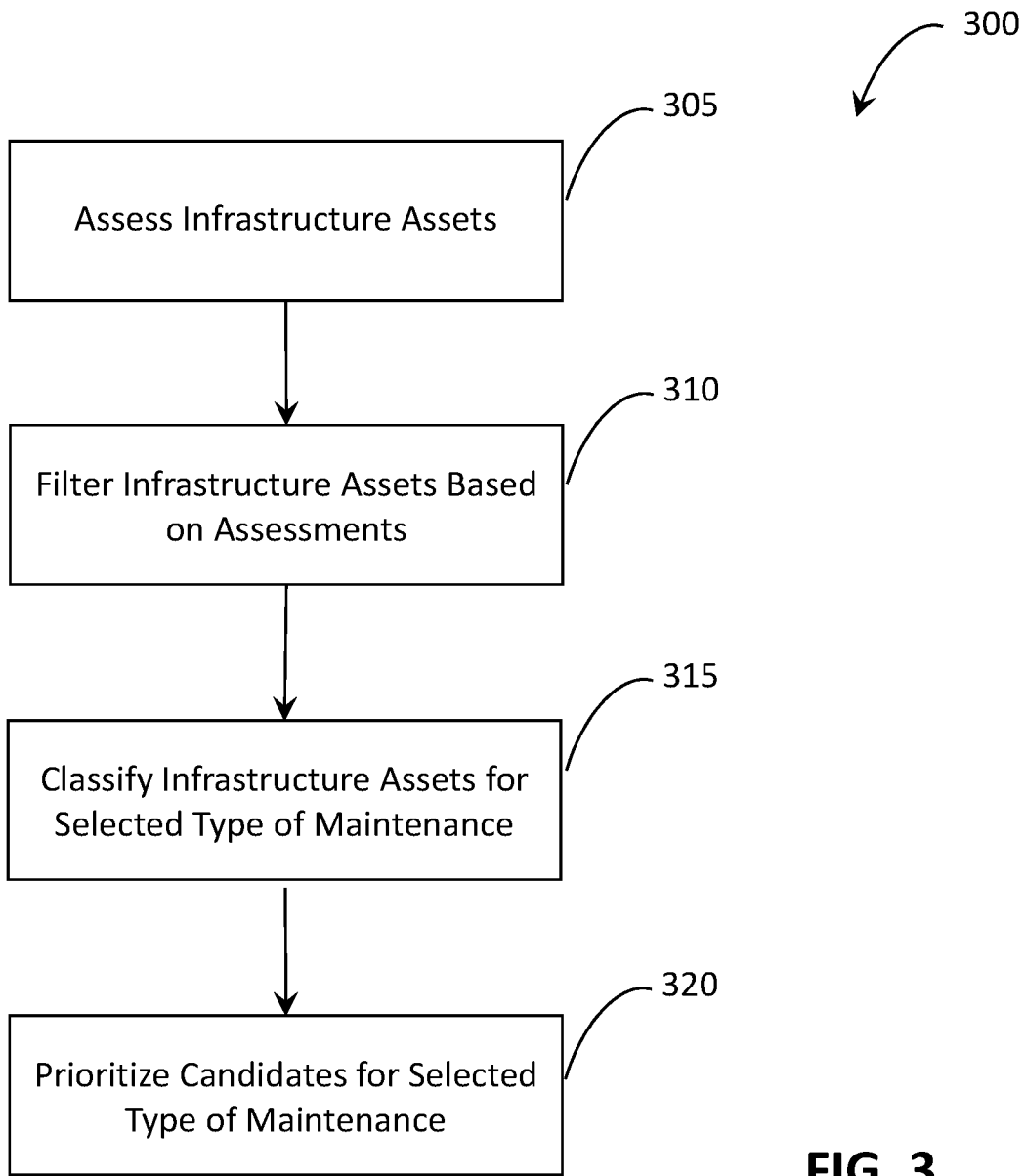
FIG. 3 shows an illustrative process 300 for identifying maintenance candidates, in accordance with some embodiments.

FIG. 3 shows an illustrative process 300 for identifying maintenance candidates, in accordance with some embodiments. For instance, the process 300 may be used by the illustrative infrastructure assessment system 100 in the example of FIG. 1A to analyze sensor data collected from infrastructure assets, and to output candidates for a selected type of maintenance.

At act 305, a plurality of infrastructure assets may be assessed. In some embodiments, the infrastructure assets may include a plurality of road segments. Each road segment may be modeled as a linestring between two geospatial locations, and may be represented by GPS coordinates of those two endpoints and/or one or more intermediate points. Such road segments may be determined from a blueprint of one or more roads to be assessed (e.g., in a municipality, county, state, etc.), or in some other suitable manner.

In some embodiments, a road segment may be associated with one or more images captured along the road segment. For instance, a data collection system such as the illustrative data collection system 105 may be used to acquire the images. The data collection system 105 may tag an image with GPS coordinates, which may in turn be used to associate the image with a road segment.

In some embodiments, a road segment may be associated with images at regularly spaced intervals (e.g., one image per meter, per 2 meters, per 3 meters, per 4 meters, per 5 meters, etc.). Additionally, or alternatively, a road segment may be associated with a three-dimensional point cloud constructed from video data collected from the road segment. Additionally, or alternatively, a road segment may be associated with an orthorectified image, which may be obtained from a plurality of image portions, for example, by projecting the image portions onto a horizontal plane to form a mosaic.

In some embodiments, each image may be analyzed to provide an assessment, for example, using the illustrative machine learning model 200 in the example of FIG. 2. This may produce one or more assessments associated, respectively, with one or more locations along a road segment. The one or more assessments may in turn be combined in a suitable manner to produce an overall assessment for the road segment.

In some embodiments, each assessment may include a numerical score, so that the one or more locations along the road segment may have associated therewith one or more respective numerical scores. The inventors have recognized and appreciated that numerical scores may be used to facilitate data aggregation. For instance, the overall assessment for the road segment may be an average (e.g., mode, median, mean, etc.) or some other measure of central tendency of the one or more numerical scores associated with the one or more locations along the road segment. However, it should be appreciated that aspects of the present disclosure are not limited to combining numerical scores in any particular way. In some embodiments, a standard deviation, a variance, or some other measure of dispersion of the per-location scores may be determined.

It should be also be appreciated that aspects of the present disclosure are not limited to using numerical scores. In some embodiments, an assessment may include one or more visual representation of detected damage on an infrastructure asset (e.g., an orthorectified image of a pavement distress on a road segment).

Returning to the example of FIG. 3, the infrastructure assets may, at act 310, be filtered based on the assessments obtained at act 305. For instance, in some embodiments, one or more filter criteria may be chosen based on the type of maintenance in question. With reference to the above example, road segments that have only minor damage (e.g., a numerical score of 2 or below) may be filtered out, because it may be wasteful to perform crack sealing on such road segments. Additionally, or alternatively, road segments that have severe damage (e.g., a numerical score of 5) may be filtered out, because such road segments may not last long even if crack sealing is performed.

However, it should be appreciated that aspects of the present disclosure are not limited to using thresholds to filter infrastructure assets. In some embodiments, a suitable logical formula may be used, where each literal in the logical formula may involve a comparison against a threshold or some other condition.

At act 315, the infrastructure assets may be classified with respect to the selected type of maintenance. In some embodiments, a machine learning model may be provided to classify the infrastructure assets based on sensor data collected from the infrastructure assets.

With reference to the above example, a machine learning model may be provided that receives, as input, an image associated with a location along a road segment. The machine learning model may be adapted to analyze the input image and output a classification label indicating whether crack sealing has already been performed at the location shown in the image. For instance, the machine learning model may output, for each pixel, a label indicating whether the pixel is likely showing sealant. The per-pixel labels may then be combined in a suitable manner to determine an overall label for the image.

Additionally, or alternatively, the machine learning model may be adapted to detect one or more pavement distresses from the input image. In some embodiments, the machine learning model may output a representation (e.g., an orthorectified image) of each detected pavement distress, and/or an assessment of a type and/or an extent of the pavement distress.

It should be appreciated that any suitable machine learning architecture may be used to classify infrastructure assets with respect to the selected type of maintenance. For instance, in some embodiments, an architecture similar to that in the example of FIG. 2 may be used.

In some embodiments, a numerical score may be determined for a detected distress based on one or more characteristics of the detected distress (e.g., a type, an extent, etc.). Numerical scores of detected distresses in an image may then be aggregated to provide an overall score for the image. Any of the data aggregation techniques described herein, and/or some other data aggregation technique, may be used.

In some embodiments, numerical scores of images collected along a road segment may be aggregated to provide an overall score for the road segment. Any of the data aggregation techniques described herein, and/or some other data aggregation technique, may be used. Moreover, a data aggregation technique used to score a road segment based on images collected along the road segment may be the same as, or different from, a data aggregation technique used to score an image based on detected distresses in the image.

In some embodiments, an overall score for a road segment may be compared against one or more thresholds to determine whether to classify the road segment as a candidate for crack sealing. The one or more thresholds may be determined in any suitable manner, for instance, based on scores of road segments that have been labeled by human decision makers. As an example, a threshold may be chosen to discriminate between: (1) road segments that have been labeled as candidates for crack sealing, and (2) those that have been labeled as exhibiting insufficient crack-sealable distresses.

In some embodiments, at least two thresholds may be used. Road segments scoring below a first threshold may be labeled as exhibiting insufficient crack-sealable distresses, while road segments scoring above a second threshold may be labeled as candidates for crack sealing. The second threshold may be higher than the first threshold. Road segments scoring between the first and second threshold may be labeled as candidates for crack sealing or exhibiting insufficient crack-sealable distresses depending on one or more other factors, such as traffic volume, traffic type (e.g., residential vs. commercial), etc.

In some embodiments, road segments that have been classified as already been sealed may be filtered out first. Remaining road segments may be processed to detect distresses, and those classified as exhibiting insufficient crack-sealable distresses may be further filtered out. However, it should be appreciated that aspects of the present disclosure are not limited to identifying candidates for crack sealing by successive filtering. In some embodiments, a machine learning model may be provided that classifies road segments, in a same step, as being already sealed, being a crack seal candidate, or exhibiting insufficient crack-sealable distresses.

At act 320, infrastructure assets that have been identified at act 315 as candidates for the selected type of maintenance may be prioritized. For instance, a plurality of candidates that are in geospatial proximity to each other may be prioritized.

With reference to the above example, a candidate batch may be constructed by first including a road segment that has been identified as a candidate for crack sealing, and then adding one or more adjacent road segments that have also been identified as candidates for crack sealing. This process may be repeated, each time adding one or more road segments that are adjacent to at least one road segment already in the candidate batch, until a number of candidates in the batch reaches a certain threshold. In some embodiments, the threshold may be selected based on a number of road segments that a work crew may be able to seal in one or more consecutive work sessions. In this manner, a work crew may be sent out to perform crack sealing on all road segments in the candidate batch, which may reduce overhead.

In some embodiments, when constructing a candidate batch, preference may be given to a new road segment that is adjacent to a terminal road segment in the candidate batch. In this manner, the candidate batch may be constructed as a path, with no branching. This may allow a work crew to start from one end of the path and proceed towards the other, thereby simplifying logistics.

In some embodiments, a measure of distance may be provided for road segments. For instance, two road segments may be considered adjacent to each other if the two road segments share an endpoint (e.g., intersection). Moreover, road segments may be organized into a plurality of sets of road segments (e.g., OpenStreetMap ways). Two adjacent road segments that are in a same set may be considered at distance zero from each other. Two adjacent road segments that are not in a same set may be considered at distance one from each other. A first road segment may be considered at distance N+1 from a second road segment if there is a third road segment such that: the first road segment is at distance N from the third road segment, and the third road segment is at distance one from the second road segment.

The inventors have recognized and appreciated that such a measure of distance may be used in constructing a candidate batch. For instance, in some embodiments, a sensitivity factor N≥0 may be provided. Given a road segment that has been identified as a candidate for crack sealing, a candidate batch for that road segment may include all road segments that are at distance at most N from that road segment.

While various implementation details are described above in connection with FIG. 3, it should be appreciated that such details are provided herein solely for purposes of illustration. For instance, although crack sealing of road segments is used as an example throughout this disclosure, it should be appreciated that any one or more of the techniques described herein may be used to identify candidates for any suitable type of maintenance to be performed on any suitable type of infrastructure assets. Examples of different types of maintenance that may be performed on road surfaces include, but are not limited to, chip sealing, cold patching, hot patching, peel & pave, mill & pave, pothole filling, etc. Moreover, any one or more of the techniques described above for constructing a candidate batch may be used, additionally, or alternatively, to batch road segments for which a selected type of maintenance is determined to have been already performed. Such a batch may, in some embodiments, be used to identify a geographic area (e.g., a neighborhood within a city) that has already received maintenance service, and therefore may be deprioritized for future maintenance.

As described above, the illustrative infrastructure assessment system 100 in the example of FIG. 1A may use the illustrative process 300 in the example of FIG. 3 to identify an infrastructure asset as a candidate for a selected type of maintenance (e.g., reparative and/or preventive maintenance). In some embodiments, the illustrative infrastructure management system 110 in the example of FIG. 1A may display the infrastructure asset with a visual indication corresponding to the selected type of maintenance.

Figure 4A:
FIG. 4A shows an illustrative user interface 400, in accordance with some embodiments.

FIG. 4A shows an illustrative user interface 400, in accordance with some embodiments. In this example, some road segments are displayed in a first color (e.g., lilac) to indicate that the road segments are identified as candidates for crack sealing, while some other road segments are displayed in a second color (e.g., light blue) to indicate it has been determined that crack sealing likely has already been performed. Road segments that are not in either category may be displayed in a default color (e.g., grey).

The inventors have recognized and appreciated that a human decision maker may wish to examine sensor data collected from an infrastructure asset to check whether an infrastructure assessment system has properly classified the infrastructure asset. Accordingly, in some embodiments, the infrastructure management system 110 may be configured to select representative sensor data for an infrastructure asset to be displayed to a user as evidence of the infrastructure asset's classification.

Figure 4B:
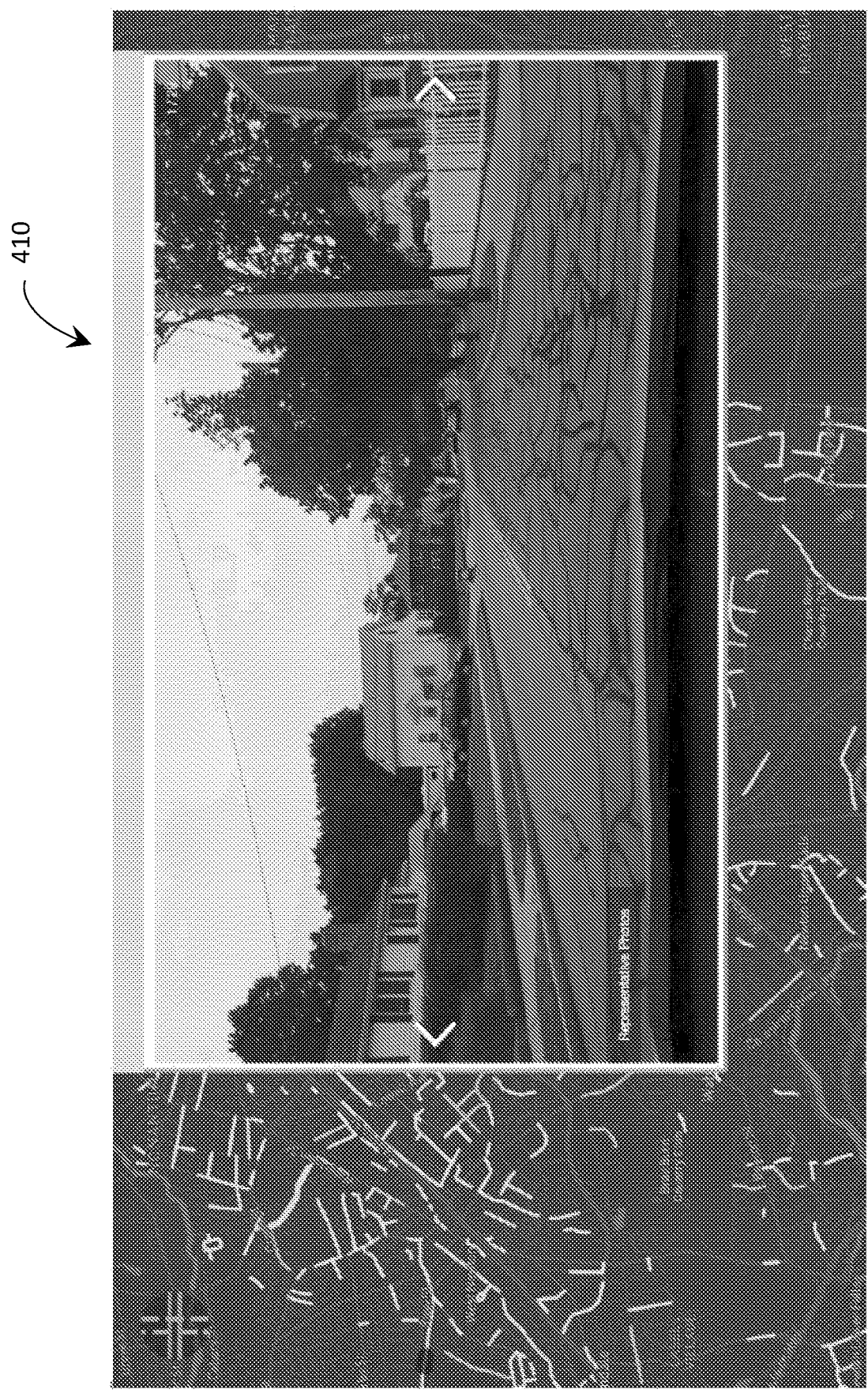
FIG. 4B shows an illustrative user interface 410, in accordance with some embodiments.

FIG. 4B shows an illustrative user interface 410, in accordance with some embodiments. In this example, it has been determined that crack sealing likely has been performed on some road segments. Such road segments may be shown in a selected color (e.g., light blue) to so indicate. In response to a user clicking on one of these road segments, an image collected from that road segment may be shown to the user. The image may have been classified by the infrastructure assessment system 100 as already been sealed.

Figure 4C:
FIG. 4C shows an illustrative user interface 420, in accordance with some embodiments.

FIG. 4C shows an illustrative user interface 420, in accordance with some embodiments. In this example, it has been determined that some road segments are too heavily damaged to be effectively repaired using crack sealing. Such road segments may be shown in a selected color (e.g., red) to so indicate. In response to a user clicking on one of these road segments, an image collected from that road segment may be shown to the user. The image may have been classified by the infrastructure assessment system 100 as exhibiting severe damage.

Figure 4D:
FIG. 4D shows an illustrative user interface 430, in accordance with some embodiments.

FIG. 4D shows an illustrative user interface 430, in accordance with some embodiments. In this example, it has been determined that some road segments are not sufficiently damaged to justify crack sealing. Such road segments may be shown in a selected color (e.g., light green) to so indicate. In response to a user clicking on one of these road segments, an image collected from that road segment may be shown to the user. The image may have been classified by the infrastructure assessment system 100 as exhibiting minor damage.

Figure 4E:
FIG. 4E shows an illustrative user interface 440, in accordance with some embodiments.

FIG. 4E shows an illustrative user interface 440, in accordance with some embodiments. In this example, it has been determined that some road segments are candidates for crack sealing. Such road segments may be shown in a selected color (e.g., lilac) to so indicate. In response to a user clicking on one of these road segments, an image collected from that road segment may be shown to the user. The image may have been classified by the infrastructure assessment system 100 as a candidate for crack sealing.

In some embodiments, additional data may be displayed to the user, such as traffic volume, traffic type (e.g., residential vs. commercial), etc. at the road segment in question. The infrastructure management system 110 may allow the user to override (e.g., based on the additional data) the classification of that road segment as a candidate for crack sealing. In some embodiments, such human decisions may be used by the infrastructure assessment system 100 to continuously train one or more machine learning models.

The inventors have recognized and appreciated that an infrastructure assessment system may, in practice, collect and/or process a large amount of data. For instance, a small town (e.g., with a population of less than 50,000) in a suburban, exurban, or rural setting may have roughly 100 miles of road network. If an infrastructure assessment system operates at a relatively high level of granularity, such as every 10 feet, tens of thousands of assessments may be performed just for a small town. Moreover, the number of assessments may grow multiplicatively if individual distresses and/or assets along a road segment are separately assessed.

The inventors have further recognized and appreciated that machine learning techniques (e.g., those based on neural networks), even at a high level of performance, may be imperfect. It may be desirable to perform quality control to identify situations where assessments obtained using such techniques may be unreliable. Furthermore, human judgment may, to some degree, be inaccurate and/or imprecise. Quality control performed by humans may suffer from the same inaccuracy and/or imprecision.

However, performing quality control may reprise challenges that machine learning techniques were intended to solve in the first place. For instance, it may be challenging to identify an erroneous assessment without reference to some sort of ground truth, but it may be costly to rely on extensive human review to provide such ground truth. Indeed, a labor-intensive quality control process may defeat the purpose of using a fully or partially automated system to inspect infrastructure assets and/or to devise maintenance plans.

Accordingly, in some embodiments, techniques for quality control may be provided to improve correctness of assessments. As an example, the inventors have recognized and appreciated that, for pavement surfaces, locations that are near each other may be expected to exhibit similar conditions. For instance, while isolated instances of individual distresses (e.g., potholes) may be possible, overall distresses (e.g., cracking, chipping, etc.) may tend to be observed in stretches (e.g., several consecutive locations exhibiting similar levels and/or types of damage). Thus, in some embodiments, assessments produced by an infrastructure assessment system (e.g., the illustrative infrastructure assessment system in the example of FIG. 1A) may be analyzed to identify unexpected distributions such as rapid changes in assessments. For instance, a moving average of assessments may be computed using an appropriate window size (e.g., 30 meters, 60 meters, 90 meters, etc.), and a potential quality issue may be flagged if a variance of the moving averages exceeds a selected threshold.

The inventors have further recognized and appreciated that a prior assessment of an infrastructure asset (e.g., an assessment that was obtained relatively recently) may be used to assess a current condition of the infrastructure asset in a more efficiently manner. For instance, a prior assessment may be assumed to be correct, and a current assessment may be expected to reflect normal wear and tear since the prior assessment was obtained. An expected amount of deterioration may depend on how much time has elapsed since the prior assessment (e.g., 6 months, 12 months, 18 months, 24 months, etc.), and/or the prior assessment itself. As an example, with respect to pavement surfaces, if a prior assessment indicated minor damage (e.g., a score of 2) and one year has elapsed, a current assessment of minor or moderate damage (e.g., a score of 2 or 3) may be expected, with some isolated instances of individual distresses (e.g., potholes) and/or some overall distresses (e.g., cracking, chipping, etc.). Thus, a potential issue may be flagged if a current assessment indicates significant or severe damage (e.g., a score of 4 or 5).

Additionally, or alternatively, a potential issue may be flagged if a current assessment indicates an improvement in condition, unless there is also an indication that maintenance has been performed. For instance, with respect to pavement surfaces, an improvement from moderate damage (e.g., a score of 3), or worse, to good condition (e.g., a score of 1) may be flagged, unless it has been determined that some type of maintenance has been performed, such as crack sealing, pothole filling, etc.

In some embodiments, assessments produced by human reviewers (also referred to herein as "human assessments") may be analyzed and/or compared against assessments produced by an infrastructure assessment system (also referred to herein as "machine assessments"). For instance, the inventors have recognized and appreciated that having multiple human reviewers perform quality control on a same set of images may allow reduction of inaccuracy and/or imprecision in human judgment. Accordingly, in some embodiments, a set of input data (e.g., images) may be provided to each of a quorum of human reviewers.

A quorum may include any suitable number of human reviewers, such as two, three, four, five, etc. However, it should be appreciated that aspects of the present disclosure are not limited to any particular number of human reviewer(s), or having any human reviewer at all. In some embodiments, quality control may be performed by a single human reviewer. Additionally, or alternatively, quality control may be performed using a measurement technique that is known to be reliable (e.g., accurate and/or precise), but unsuitable for large-scale deployment (e.g., for cost reasons).

A set of input data (e.g., images) may be assigned to a quorum of human reviewers in any suitable manner. For instance, as discussed above, the inventors have recognized and appreciated that locations that are near each other may exhibit similar pavement conditions. Accordingly, in some embodiments, input data collected from a same road segment (e.g., a same OpenStreetMap way) may be assigned to a same quorum of human reviewers. For example, reviewers A, B, C may perform quality control on a batch of images taken from a first road segment, reviewers A, C, D may perform quality control on a batch of images taken from a second road segment, reviewers B, D, F may perform quality control on a batch of images taken from a third road segment, etc.

It should be appreciated that spatial proximity may be determined in any suitable manner. For instance, in some embodiments, batches may be provided such that locations in a same batch may be within a selected distance (e.g., 30 meters, 60 meters, 90 meters, etc.) from each other. Additionally, or alternatively, batches may be provided based on street name. For example, images associated with a same street in a same municipality may be batched together.

It should also be appreciated that aspects of the present disclosure are not limited to batching input data based on spatial proximity, or at all. In some embodiments, batches may be provided based on road classification (e.g., motorways, trunks, primary roads, secondary roads, tertiary roads, residential roads, etc.).

In some embodiments, human reviewers may be prompted to provide an assessment score for a given item of input data (e.g., 1 for good condition, 2 for minor damage, 3 for moderate damage, 4 for significant damage, 5 for severe damage, etc.). Additionally, or alternatively, human reviewers may be prompted to provide some other suitable classification label (e.g., a label indicating a selected type of maintenance has already been performed on an infrastructure asset, a label indicating the infrastructure asset does not have sufficiently many instances of damage that may be addressed effectively by the selected type of maintenance, a label indicating the infrastructure asset is a good candidate for the selected type of maintenance, etc.).

In some embodiments, assessments provided by a human reviewer for a batch of input data may be analyzed and/or compared against assessments by another human reviewer for the same batch of input data. For instance, a measure of central tendency (e.g., mean, median, mode, etc.) may be determined for assessments provided by each human reviewer for the same batch of input data. Such central tendency values may be compared to assess a human reviewer's work with respect to that batch of input data. For example, a measure of central tendency (e.g., mean, median, mode, etc.) may be determined for the per-reviewer central tendency values. A human reviewer may be determined to be an average reviewer with respect to that batch of input data if that human reviewer's central tendency value is within a selected range of the central tendency value of the per-reviewer central tendency values. Likewise, a human reviewer may be determined to be an easy (or harsh) reviewer with respect to that batch of input data if that human reviewer's central tendency value is less (or greater) than the selected range of the central tendency value of the per-reviewer central tendency values. In some embodiments, if a human reviewer's central tendency value for that batch of input data is more than a selected threshold away from the central tendency value of the per-reviewer central tendency values, that human reviewer's assessments for that batch of input data may be discarded.

Additionally, or alternatively, a histogram may be constructed for assessments provided by a human reviewer for a batch of input data. For instance, with respect to pavement surfaces, a percentage may be computed for each possible value of an assessment score (e.g., 1 for good condition, 2 for minor damage, 3 for moderate damage, 4 for significant damage, 5 for severe damage, etc.). Such a histogram may be compared against histograms constructed for other human reviewers performing quality control on the same batch of input data. The human reviewer's assessments for that batch of input data may be discarded if his/her histogram differs significantly from the other human reviewers' histograms. As an example, for a given bin, the human reviewer's percentage for that bin may be considered anomalous if it is more than a selected threshold away from a central tendency value of all human reviewers' percentages for that bin. Additionally, or alternatively, the human reviewer's histogram may be considered anomalous if more than a selected threshold number of bins exhibit anomalies.

It should be appreciated that aspects of the present disclosure are not limited to binning assessments in any particular manner, or at all. Moreover, in some embodiments, machine assessments may be binned and compared in a similar manner, for example, against human assessments on a same batch of input data.

It should also be appreciated that aspects of the present disclosure are not limited to labeling a human reviewer's work in any particular manner, or at all. For instance, referring again to the above example, a human reviewer's work with respect to the given batch of input data may be labeled with a performance score indicative of how the human reviewer's central tendency value deviates from the central tendency value of the per-reviewer central tendency values. Thus, a negative performance score may indicate the human reviewer is a relatively easy reviewer with respect to that batch of input data, whereas a positive performance score may indicate the human reviewer is a relatively harsh reviewer with respect to that batch of input data. Additionally, or alternatively, a magnitude of the performance score may indicate an extent of deviation of the human reviewer's central tendency value from the central tendency value of the per-reviewer central tendency values.

In some embodiments, a human reviewer's performance scores across multiple batches of input data may be analyzed. (These batches may have been reviewed by a same quorum of human reviewers, or different ones.) For instance, a measure of central tendency (e.g., mean, median, mode, etc.) and/or a measure of dispersion (e.g., standard deviation, variance, etc.) may be determined for a human reviewer's performance scores. A human reviewer who is consistently easy/harsh (e.g., a low dispersion value) may receive training to recalibrate his/her judgment. Additionally, or alternatively, assessments produced by that human reviewer may be adjusted based on the central tendency value of his/her performance scores.

By contrast, a human reviewer who is inconsistent (e.g., high dispersion value) may receive more comprehensive training. Additionally, or alternatively, assessments produced by that human reviewer may be discarded. For example, a human reviewer's assessments for multiple batches of input data may be discarded if that human reviewer's performance scores across those batches of input data have a dispersion value that is higher than a selected threshold. The inventors have recognized and appreciated that it may be desirable to analyze a distribution of assessments produced by a quorum of human reviewers on a same item of input data. Accordingly, in some embodiments, a measure of dispersion may be determined for assessments produced by a quorum of human reviewers on an item of input data. For instance, three human reviewers may be given a same image, and may be prompted to provide an assessment score and/or some other suitable classification label. If all of the three reviewers produce a common assessment, the image may be assigned a label (e.g., UNANIMOUS) indicating a complete agreement among the reviewers. Additionally, or alternatively, if two of the three reviewers produce a common assessment, but the third reviewer produces a different assessment, the image may be assigned a label (e.g., MAJORITY) indicating an agreement among a majority of the reviewers. Additionally, or alternatively, if the three reviewers produce three different assessments, respectively, the image may be assigned a label (e.g., SPLIT) indicating there is no majority opinion.

In some embodiments, a human reviewer may be assessed based on how frequently he/she is in a unanimous judgment, how frequently he/she is part of a majority in a majority judgment, how frequently he/she is part of a minority in a majority judgment, and/or how frequently he/she is in a split judgment. One or more such frequencies may be computed for a batch of input data, or across multiple batches of input data. Over time, a human reviewer may be expected to be in a unanimous judgment or part of a majority in a majority judgment more frequently. A human reviewer who remains in a split judgment or part of a minority in a majority judgment frequently may be identified to receive additional training.

Additionally, or alternatively, a quorum of human reviewers may be assessed based on how frequently it produces a unanimous judgment, how frequently it produces a majority judgment, and/or how frequently it produces a split judgment. For instance, if a quorum of human reviewers produces more than a threshold percentage of split judgments for a batch of input data, that may suggest an input data quality issue (e.g., blurry and/or dark images). Accordingly, all of the quorum's assessments for that batch of input data, or just those assessments that are in split judgments, may be discarded.

Additionally, or alternatively, a percentage of split judgments within a batch of input data may be viewed against a number of items in that batch of input data. For instance, the inventors have recognized and appreciated that input data quality issues tend to occur sporadically (e.g., just a few blurry and/or dark images in a large batch of images). Accordingly, a high percentage (e.g., greater than a selected threshold percentage) of split judgments, coupled with a large number (e.g., more than a selected threshold number) of items in a batch of input data, may suggest a performance issue for a quorum of human reviewers assigned to that batch of input data. In some embodiments, an infrastructure asset may be assessed based on an aggregate degree of agreement. For instance, given a road segment, a measure of central tendency (e.g., mean, median, mode, etc.) may be determined for labels assigned to images under quality control for that road segment. As an example, a UNANIMOUS label may be converted to a numerical score of 1, a SPLIT label may be converted to a numerical score of 0, and/or a MAJORITY label may be converted to a numerical score of 0.5, and a mean score may be computed.

In some embodiments, a user interface of an infrastructure management system (e.g., the illustrative infrastructure management system 110 in the example of FIG. 1A) may allow a supervisor to call up one or more data items with split judgments (e.g., one or more items from a large batch of input data with a high percentage of split judgments). The supervisor may view such a data item and resolve the disagreement in assessments. Additionally, or alternatively, the supervisor may identify one or more of the human reviewers who produced the assessments to receive additional training.

It should be appreciated that a disagreement among human reviewers may be resolved in any suitable manner, with or without input from a supervisor. For instance, given an item of input data, a measure of central tendency (e.g., mean, median, mode, etc.) of assessments produced by a quorum of human reviewers may be used as an assessment for that item of input data. Additionally, or alternatively, an extremum of assessments produced by a quorum of human reviewers (e.g., a least or most amount of damage) may be used as an assessment for that item of input data.

In some embodiments, machine assessments may be compared against human assessments, for example, to determine whether one or more techniques used to produce the machine assessments should be considered reliable. For instance, a machine assessment of an item of input data may be compared against one or more human assessments for the same item of input data. If there is agreement (e.g., UNANIMOUS or MAJORITY) among the one or more human assessments, a machine assessment that agrees with the one or more human assessments may be considered reliable, whereas a machine assessment that disagrees with the one or more human assessments may be considered unreliable. By contrast, if there is disagreement (e.g., SPLIT) among the one or more human assessments, no reliability determination may be made for the machine assessment.

In some embodiments, reliability determinations for individual machine assessments may be aggregated. For instance, machine assessments for a batch of input data may be considered reliable if sufficiently many (e.g., more than a selected threshold) of the individual machine assessments are considered reliable.

Additionally, or alternatively, one or more statistics (e.g., one or more measures of central tendency, dispersion, etc.) may be computed for machine assessments for a batch of input data, and may be compared against similar statistics for human assessments for the same batch of input data. As an example, machine assessments for a batch of input data may be considered reliable if a central tendency value of the machine assessments is within a selected range of a central tendency value of human assessments for the same batch of input data. As another example, machine assessments for a batch of input data may be considered unreliable if a dispersion value of the machine assessments exceeds, by more than a selected threshold, a dispersion value of human assessments for the same batch of input data.

The inventors have recognized and appreciated that one or more machine learning models may be used to analyze potential correlations between human assessments and machine assessments. (The latter may themselves be obtained using one or more machine learning models.) For instance, in some embodiments, one or more machine learning models may be used to predict a human assessment for an item of input data based on a machine assessment for the same item of input data, or vice versa.

As discussed above, the inventors have recognized and appreciated that, for pavement surfaces, locations that are near each other may exhibit similar conditions. Accordingly, in some embodiments, a machine learning model may be trained to predict a human assessment for a first image taken at a first location, given a machine assessment for the first image, human assessment(s) for one or more second images taken respectively at one or more second locations near the first location, and/or machine assessment(s) for the one or more second images. For instance, if a road segment is associated with images at regularly spaced intervals (e.g., one image per meter, per 2 meters, per 3 meters, per 4 meters, per 5 meters, etc.), the one or more second images may include an image immediately preceding the first image and/or an image immediately following the first image.

It should be appreciated that any suitable machine learning architecture may be used to predict a human assessment for an image. For instance, in some embodiments, an architecture similar to that in the example of FIG. 2 may be used.

It also should be appreciated that aspects of the present disclosure are not limited to predicting a human assessment for an image in any particular manner, or at all. For instance, in some embodiments, a machine learning model may be trained to predict a human assessment for a first image taken at a first location, given human assessment(s) for one or more second images taken respectively at one or more second locations near the first location (e.g., an immediately preceding image and/or an immediately following image). The machine learning model may not receive, as input, a machine assessment for the first image or any second image.

The inventors have recognized and appreciated that a workload for human reviewers may be reduced by using a machine learning model to predict a human assessment for an image, instead of having one or more human reviewers actually perform quality control on that image. For instance, one or more human reviewers may perform quality control on every other image in a sequence of images taken along a road segment. A human assessment for an image not reviewed may be predicted based on a machine assessment for that image, human and machine assessments for an immediately preceding image, and human and machine assessments for an immediately following image.

In some embodiments, a machine learning model for predicting human assessments may be trained using actual human assessments. For instance, to obtain training data, one or more human reviewers may perform quality control on every image in a sequence of images taken along a road segment. During training, predictions may be made for one or more images based on actual human assessments of one or more other images. A predicted human assessment may be compared against an actual human assessment to determine an error.

In some embodiments, one or more human reviewers may perform quality control on an image taken at an endpoint of a road segment, regardless of whether the image has an even index or an odd index in a sequence of images take along that road segment. Additionally, or alternatively, one or more human reviewers may perform quality control on an image if a machine assessment for an immediately preceding image diverge significantly (e.g., more than a selected threshold amount) from a machine assessment for an immediately following image. For instance, an immediately preceding image may be assigned a score of 5, whereas an immediately following image may be assigned a score of 1, or vice versa. This may occur, for example, at a transition between freshly reconstructed road surface and road surface that is being reconstructed.

Similarly, in some embodiments, one or more human reviewers may perform quality control on an image if human assessments for an immediately preceding image diverge significantly (e.g., more than a selected threshold amount) from human assessments for an immediately following image. For instance, the one or more human reviewers may have provided a score of 5 to an immediately preceding image, but a score of 1 for an immediately following image may be assigned, or vice versa. Additionally, or alternatively, the one or more human reviewers may have had a disagreement (e.g., SPLIT) on an immediately preceding image, but may be in agreement (e.g., UNANIMOUS) on an immediately following image, or vice versa.

Illustrative configurations of various aspects of the present disclosure are provided below.

1. A system comprising: at least one processor; and at least one non-transitory computer-readable medium having encoded thereon instructions which, when executed, program the at least one processor to: analyze sensor data collected from a plurality of infrastructure assets; and identify, based at least in part on the sensor data, at least one infrastructure asset from the plurality of infrastructure assets as a candidate for a selected type of maintenance, wherein: the at least one infrastructure asset comprises at least one road segment; the sensor data comprises a plurality of images taken along the at least one road segment; the plurality of images comprise a first image; and analyzing the sensor data comprises using a first machine learning model to identify, from the first image, at least one image portion exhibiting a selected type of damage; and use a second machine learning model to predict a human assessment of the first image, based on at least one actual human assessment of at least one second image of the plurality of images.

2. The system of configuration 1, wherein: the plurality of images comprise a sequence of images; and the at least one second image comprises an image that, in the sequence of images, immediately precedes or immediately follows the first image.

3. The system of configuration 1, wherein: the at least one actual human assessment comprises a plurality of human assessments produced, respectively, by a plurality of human reviewers reviewing a same image.

4. The system of configuration 1, wherein: the second machine learning model is configured to predict a human assessment of the first image further based on a machine assessment of the first image and/or at least one machine assessment of the at least one second image.

5. A system comprising: at least one processor; and at least one non-transitory computer-readable medium having encoded thereon instructions which, when executed, program the at least one processor to: analyze sensor data collected from a plurality of infrastructure assets; and identify, based at least in part on the sensor data, at least one infrastructure asset from the plurality of infrastructure assets as a candidate for a selected type of maintenance, wherein: the sensor data comprises an image of the at least one infrastructure asset; and analyzing the sensor data comprises using at least one machine learning model to identify, from the image, at least one image portion exhibiting a selected type of damage.

6. The system of configuration 5, wherein: the at least one infrastructure asset comprises a road segment; the selected type of damage comprises transverse or longitudinal cracking; and the selected type of maintenance comprises crack sealing.

7. The system of configuration 5, wherein: the at least one machine learning model is configured to determine whether the selected type of maintenance has been performed on the at least one infrastructure asset.

8. The system of configuration 5, wherein: the at least one machine learning model is configured to determine whether the at least one infrastructure asset exhibits an insufficient number of instances of damage that is effectively addressable by the selected type of maintenance.

9. The system of configuration 5, wherein: the at least one machine learning model is configured to determine whether the at least one infrastructure asset exhibits an excessive number of instances of damage of one or more types other than the selected type of damage.

10. The system of configuration 5, wherein: the at least one processor is further programmed to prioritize a plurality of candidates for the selected type of maintenance based on geospatial proximity of the plurality of candidates.

11. The system of configuration 5, wherein: the at least one processor is further programmed to: output an assessment for each infrastructure asset of the plurality of infrastructure assets, the assessment being indicative of a condition of the infrastructure asset; and use one or more thresholds to filter the plurality of infrastructure assets based on the assessments.

12. The system of configuration 1, wherein: the at least one processor is further programmed to determine a dispersion value for a plurality of human assessments produced, respectively, by a plurality of human reviewers reviewing the image of the at least one infrastructure asset.

13. The system of configuration 12, wherein: the dispersion value comprises at least one label selected from a group consisting of: a label indicating a complete agreement among the plurality of human reviewers; a label indicating an agreement among a majority of the plurality of human reviewers; and a label indicating there is no agreement among a majority of the plurality of human reviewers.

14. The system of configuration 12, wherein: the at least one infrastructure asset comprises at least one road segment; the sensor data comprises a plurality of images taken along the at least one road segment; the at least one processor is further programmed to: determine, for each image of the plurality of images, a dispersion value for a plurality of human assessments produced, respectively, by the plurality of human reviewers reviewing that image of the plurality of images; and determine, based on the dispersion values associated, respectively, with the plurality of images, an aggregate degree of agreement for the at least one road segment.

15. A system comprising: at least one processor; and at least one non-transitory computer-readable medium having encoded thereon instructions which, when executed, program the at least one processor to: analyze sensor data collected from a plurality of infrastructure assets; and identify, based at least in part on the sensor data, at least one infrastructure asset from the plurality of infrastructure assets as a candidate for a selected type of maintenance.

16. The system of configuration 15, wherein: analyzing sensor data comprises using at least one machine learning model to process the sensor data.

17. The system of configuration 16, wherein: the at least one machine learning model comprises a plurality of blocks arranged in a sequence to process the sensor data; and the plurality of blocks comprise a convolution block, a normalization block, a residual block, and/or a classification block.

18. The system of configuration 16, wherein: the at least one machine learning model has been trained using labeled data.

19. A method performed by the system in any of configurations 1-18.

20. The at least one computer-readable medium in the system in any of configurations 1-18.

Figure 5:
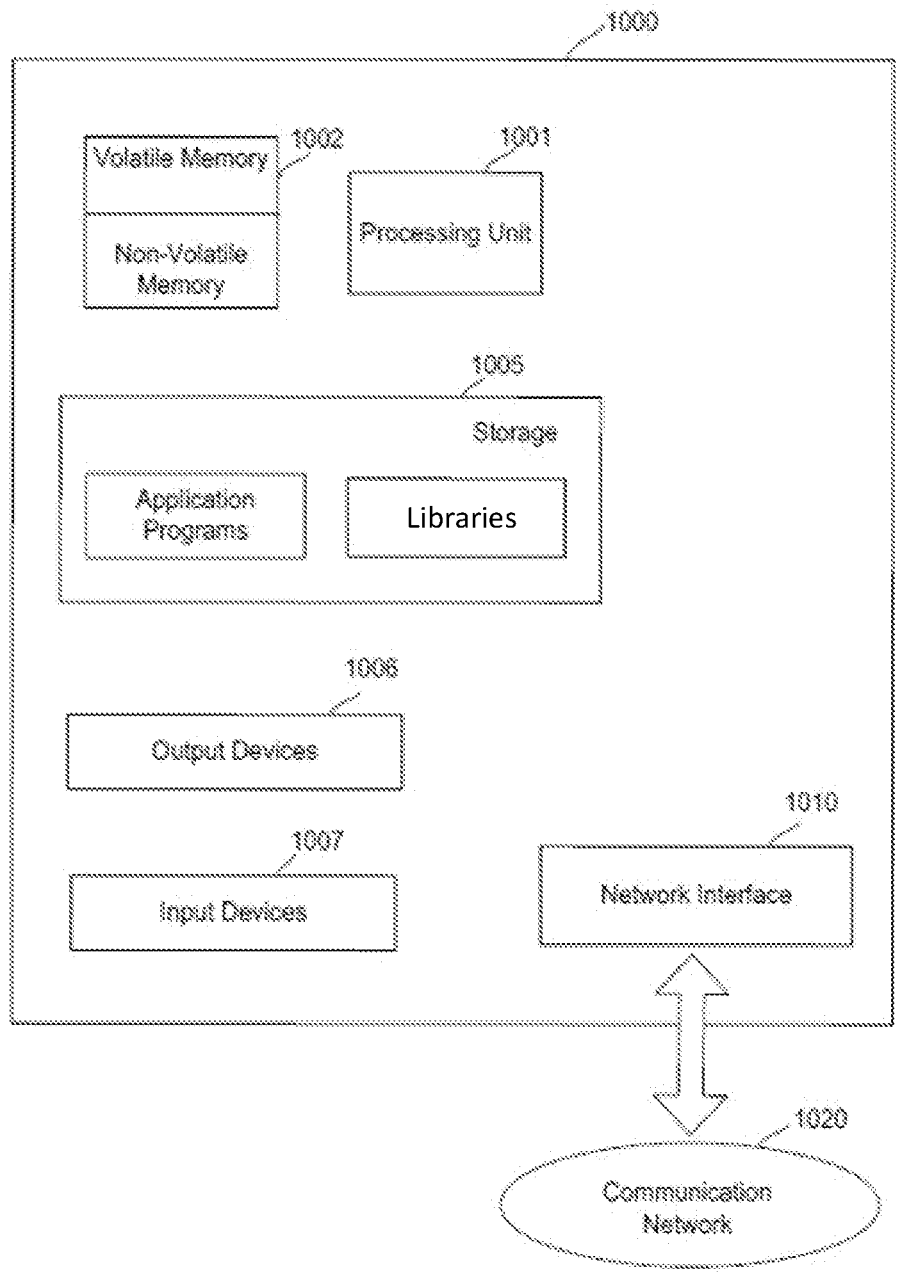
FIG. 5 shows, schematically, an illustrative computer 1000 on which any aspect of the present disclosure may be implemented.

FIG. 5 shows, schematically, an illustrative computer 1000 on which any aspect of the present disclosure may be implemented.

In the example shown in FIG. 5, the computer 1000 includes a processing unit 1001 having one or more computer hardware processors and one or more articles of manufacture that comprise at least one non-transitory computer-readable medium (e.g., memory 1002) that may include, for example, volatile and/or non-volatile memory. The memory 1002 may store one or more instructions to program the processing unit 1001 to perform any of the functions described herein. The computer 1000 may also include other types of non-transitory computer-readable media, such as storage 1005 (e.g., one or more disk drives) in addition to the memory 1002. The storage 1005 may also store one or more application programs and/or resources used by application programs (e.g., software libraries), which may be loaded into the memory 1002. To perform any of the illustrative functionalities described herein, processing unit 1001 may execute one or more processor-executable instructions stored in the one or more non-transitory computer-readable media (e.g., the memory 1002, the storage 1005, etc.), which may serve as non-transitory computer-readable media storing processor-executable instructions for execution by the processing unit 1001.

The computer 1000 may have one or more input devices and/or output devices, such as devices 1006 and 1007 illustrated in FIG. 5. These devices may be used, for instance, to present a user interface. Examples of output devices that may be used to provide a user interface include printers, display screens, and other devices for visual output, speakers and other devices for audible output, braille displays and other devices for haptic output, etc. Examples of input devices that may be used for a user interface include keyboards, pointing devices (e.g., mice, touch pads, and digitizing tablets), microphones, etc. For instance, the input devices 1007 may include a microphone for capturing audio signals, and the output devices 1006 may include a display screen for visually rendering, and/or a speaker for audibly rendering, recognized text.

In the example shown in FIG. 5, the computer 1000 also includes one or more network interfaces (e.g., the network interface 1010) to enable communication via various networks (e.g., the network 1020). Examples of networks include local area networks (e.g., an enterprise network), wide area networks (e.g., the Internet), etc. Such networks may be based on any suitable technology operating according to any suitable protocol, and may include wireless networks and/or wired networks (e.g., fiber optic networks).

Having thus described several aspects of at least one embodiment, it is to be appreciated that various alterations, modifications, and improvements will readily occur to those skilled in the art. Such alterations, modifications, and improvements are intended to be within the spirit and scope of the present disclosure. Accordingly, the foregoing descriptions and drawings are by way of example only.

The above-described embodiments of the present disclosure can be implemented in any of numerous ways. For example, the embodiments may be implemented using hardware, software, or a combination thereof. When implemented in software, the software code may be executed on any suitable processor or collection of processors, whether provided in a single computer or distributed among multiple computers.

Also, the various methods or processes outlined herein may be coded as software that is executable on one or more processors running any one of a variety of operating systems or platforms. Such software may be written using any of a number of suitable programming languages and/or programming tools, including scripting languages and/or scripting tools. In some instances, such software may be compiled as executable machine language code or intermediate code that is executed on a framework or virtual machine. Additionally, or alternatively, such software may be interpreted The techniques disclosed herein may be embodied as a non-transitory computer-readable medium (or multiple non-transitory computer-readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more processors, perform methods that implement the various embodiments of the present disclosure discussed above. The computer-readable medium or media may be portable, such that the program or programs stored thereon may be loaded onto one or more different computers or other processors to implement various aspects of the present disclosure as discussed above.

The terms "program" or "software" are used herein to refer to any type of computer code or set of computer-executable instructions that may be employed to program one or more processors to implement various aspects of the present disclosure as discussed above. Moreover, it should be appreciated that according to one aspect of this embodiment, one or more computer programs that, when executed, perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Program modules may include routines, programs, objects, components, data structures, etc. that perform particular tasks or implement particular abstract data types. Functionalities of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields to locations in a computer-readable medium that convey how the fields are related. However, any suitable mechanism may be used to relate information in fields of a data structure, including through the use of pointers, tags, or other mechanisms that establish how the data elements are related.

Various features and aspects of the present disclosure may be used alone, in any combination of two or more, or in a variety of arrangements not specifically discussed in the embodiments described in the foregoing, and are therefore not limited to the details and arrangement of components set forth in the foregoing description or illustrated in the drawings. For example, aspects described in one embodiment may be combined in any manner with aspects described in other embodiments.

Also, the techniques disclosed herein may be embodied as methods, of which examples have been provided. The acts performed as part of a method may be ordered in any suitable way. Accordingly, embodiments may be constructed in which acts are performed in an order different from illustrated, which may include performing some acts simultaneously, even though shown as sequential acts in illustrative embodiments.

Use of ordinal terms such as "first," "second," "third," etc. in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," "based on," "according to," "encoding," and variations thereof herein, is meant to encompass the items listed thereafter and equivalents thereof as well as additional items.

The invention claimed is:

1. A system comprising:
   at least one processor; and
   at least one non-transitory computer-readable medium having encoded thereon instructions which, when executed, program the at least one processor to:
   determine, based on sensor data collected from a first plurality of road segments, an assessment for each road segment of the first plurality of road segments, the assessment being indicative of an overall condition of the road segment;

use one or more selected thresholds to filter the first plurality of road segments, based on the respective assessments, thereby obtaining a second plurality of road segments, wherein:
  the at least one processor is programmed to filter out road segments having assessments above a selected threshold indicative of severe damage;
identify, based on the sensor data, at least one road segment from the second plurality of road segments as a candidate for a selected type of maintenance, wherein:
  the sensor data comprises an image of the at least one road segment; and
  the at least one processor is programmed to use at least one machine learning model to identify, from the image, one or more instances of physical damage exhibited by the at least one road segment; and
construct a candidate batch comprising road segments that are identified as candidates for the selected type of maintenance.

2. The system of claim 1, wherein:
the one or more instances of physical damage comprise one or more instances of transverse or longitudinal cracking; and
the selected type of maintenance comprises crack sealing.

3. The system of claim 1, wherein:
the at least one machine learning model is configured to determine whether the selected type of maintenance has been performed on the at least one road segment; and
the at least one road segment is identified as a candidate for the selected type of maintenance in response to determining that the selected type of maintenance has not been performed on the at least one road segment.

4. The system of claim 1, wherein:
the at least one machine learning model is configured to determine whether the at least one road segment exhibits an insufficient number of instances of physical damage that is effectively addressable by the selected type of maintenance; and
the at least one road segment is identified as a candidate for the selected type of maintenance in response to determining that the at least one road segment does not exhibit an insufficient number of instances of physical damage that is effectively addressable by the selected type of maintenance.

5. The system of claim 1, wherein:
the at least one machine learning model is configured to determine whether the at least one road segment exhibits an excessive number of instances of physical damage of one or more types other than a selected type of physical damage.

6. The system of claim 1, wherein:
the at least one processor is programmed to construct a candidate batch at least in part by prioritizing a plurality of candidates for the selected type of maintenance, over other candidates for the selected type of maintenance, based on geospatial proximity of the plurality of candidates.

7. The system of claim 1, wherein:
the sensor data comprises at least one image of a selected road segment;
the at least one processor is programmed to determine the assessment of the selected road segment at least in part by applying at least one first machine learning model to the at least one image to obtain a machine assessment of the selected road segment; and
the at least one processor is further programmed to determine whether the machine assessment of the selected road segment is reliable, at least in part by:
  determining whether there is agreement among a plurality of human assessments of the selected road segment, wherein the plurality of human assessments are produced, respectively, by a plurality of human reviewers reviewing the selected road segment; and
  in response to determining that there is agreement among the plurality of human assessments of the selected road segment, using the plurality of human assessments of the selected road segment to improve correctness of the machine assessment of the selected road segment.

8. The system of claim 7, wherein:
the sensor data comprises a sequence of images acquired by a moving camera;
the at least one image of the selected road segment comprises a first image in the sequence of images;
the at least one processor is further programmed to use at least one second machine learning model to generate a predicted human assessment of the first image;
the at least one second machine learning model is configured to receive, as input, at least one actual human assessment of at least one second image in the sequence of images; and
the at least one second image comprises an image that, in the sequence of images, immediately precedes or immediately follows the first image.

9. The system of claim 8, wherein:
the at least one second machine learning model is further configured to receive, as input, a machine assessment of the first image and/or at least one machine assessment of the at least one second image.

10. The system of claim 7, wherein the at least one processor is further programmed to:
determine, for each human reviewer of the plurality of human reviewers, a per-reviewer central tendency value for a plurality of human assessments produced by that human reviewer reviewing a plurality of images; and
determine, for a given human reviewer, whether that human reviewer's per-reviewer central tendency value is within a selected range of a central tendency value of the per-reviewer central tendency values of the plurality of human reviewers.

11. The system of claim 7, wherein the at least one processor is further programmed to:
assess a human reviewer based on at least one frequency selected from a group consisting of:
  a frequency at which the human reviewer is in a unanimous judgment;
  a frequency at which the human reviewer is part of a majority in a majority judgment;
  a frequency at which the human reviewer is part of a minority in a majority judgment; and
  a frequency at which the human reviewer is in a split judgment.

12. The system of claim 7, wherein:
the sensor data comprises a plurality of images of the selected road segment; and
the at least one processor is further programmed to:
  determine, for each image of the plurality of images of the selected road segment, a per-image dispersion value for a plurality of human assessments of the selected road segment produced, respectively, by the plurality of human reviewers reviewing that image of the plurality of images of the selected road segment; and determine, based on the per-image dispersion values associated, respectively, with the plurality of images of the selected road segment, an aggregate degree of agreement for the selected road segment among the plurality of human reviewers.

13. A computer-implemented method comprising acts of:
determining, based on sensor data collected from a first plurality of road segments, an assessment for each road segment of the first plurality of road segments, the assessment being indicative of an overall condition of the road segment;
using one or more selected thresholds to filter the first plurality of road segments, based on the respective assessments, thereby obtaining a second plurality of road segments, wherein:
using one or more selected thresholds to filter the first plurality of road segments comprises filtering out road segments having assessments above a selected threshold indicative of severe damage;
identifying, based on the sensor data, at least one road segment from the second plurality of road segments as a candidate for a selected type of maintenance, wherein:
the sensor data comprises an image of the at least one road segment; and
identifying the at least one road segment as a candidate for the selected type of maintenance comprises using at least one machine learning model to identify, from the image, one or more instances of physical damage exhibited by the at least one road segment; and
constructing a candidate batch comprising road segments that are identified as candidates for the selected type of maintenance.

14. The computer-implemented method of claim 13, wherein:
the one or more instances of physical damage comprise one or more instances of transverse or longitudinal cracking; and
the selected type of maintenance comprises crack sealing.

15. The computer-implemented method of claim 13, wherein:
the at least one machine learning model is configured to determine whether the selected type of maintenance has been performed on the at least one road segment; and
the at least one road segment is identified as a candidate for the selected type of maintenance in response to determining that the selected type of maintenance has not been performed on the at least one road segment.

16. The computer-implemented method of claim 13, wherein:
the at least one machine learning model is configured to determine whether the at least one road segment exhibits an insufficient number of instances of physical damage that is effectively addressable by the selected type of maintenance; and
the at least one road segment is identified as a candidate for the selected type of maintenance in response to determining that the at least road segment does not exhibit an insufficient number of instances of physical damage that is effectively addressable by the selected type of maintenance.

17. The computer-implemented method of claim 13, wherein:
the at least one machine learning model is configured to determine whether the at least one road segment exhibits an excessive number of instances of damage of one or more types other than a selected type of physical damage.

18. The computer-implemented method of claim 13, wherein:
the act of constructing a candidate batch comprises prioritizing a plurality of candidates for the selected type of maintenance, over other candidates for the selected type of maintenance, based on geospatial proximity of the plurality of candidates.

19. The computer implemented method of claim 13, wherein:
the sensor data comprises at least one image of a selected road segment;
the act of determining the assessment of the selected road segment comprises applying at least one first machine learning model to the at least one image to obtain a machine assessment of the selected road segment; and
the method further comprises an act of determining whether the machine assessment of the selected road segment is reliable, at least in part by:
determining whether there is agreement among a plurality of human assessments of the selected road segment, wherein the plurality of human assessments are produced, respectively, by a plurality of human reviewers reviewing the selected road segment; and
in response to determining that there is agreement among the plurality of human assessments of the selected road segment, using the plurality of human assessments of the selected road segment to improve correctness of the machine assessment of the selected road segment.

20. The computer implemented method of claim 19, wherein:
the sensor data comprises a sequence of images acquired by a moving camera;
the at least one image of the selected road segment comprises a first image in the sequence of images;
the method further comprises an act of using at least one second machine learning model to generate a predicted human assessment of the first image;
the at least one second machine learning model is configured to receive, as input, at least one actual human assessment of at least one second image in the sequence of images; and
the at least one second image comprises an image that, in the sequence of images, immediately precedes or immediately follows the first image.

21. The computer implemented method of claim 20, wherein: the at least one second machine learning model is further configured to receive, as input, a machine assessment of the first image and/or at least one machine assessment of the at least one second image.

22. The computer implemented method of claim 19, further comprising acts of:
determining, for each human reviewer of the plurality of human reviewers, a per-reviewer central tendency value for a plurality of human assessments produced by that human reviewer reviewing a plurality of images; and
determining, for a given human reviewer, whether that human reviewer's per-reviewer central tendency value is within a selected range of a central tendency value of the per-reviewer central tendency values of the plurality of human reviewers.

23. The computer implemented method of claim 19, further comprising an act of:
- assessing a human reviewer based on at least one frequency selected from a group consisting of:
  - a frequency at which the human reviewer is in a unanimous judgment;
  - a frequency at which the human reviewer is part of a majority in a majority judgment;
  - a frequency at which the human reviewer is part of a minority in a majority judgment; and
  - a frequency at which the human reviewer is in a split judgment.

24. The computer implemented method of claim 19, wherein:
- the sensor data comprises a plurality of images of the selected road segment; and
- the method further comprises acts of:
  - determining, for each image of the plurality of images of the selected road segment, a per-image dispersion value for a plurality of human assessments of the selected road segment produced, respectively, by the plurality of human reviewers reviewing that image of the plurality of images of the selected road segment; and
  - determining, based on the per-image dispersion values associated, respectively, with the plurality of images of the selected road segment, an aggregate degree of agreement for the selected road segment among the plurality of human reviewers.

25. At least one non-transitory computer-readable medium having encoded thereon instructions which, when executed, program at least one processor to perform a method comprising acts of:
- determining, based on sensor data collected from a first plurality of road segments, an assessment for each road segment of the first plurality of road segments, the assessment being indicative of an overall condition of the road segment;
- using one or more selected thresholds to filter the first plurality of road segments, based on the respective assessments, thereby obtaining a second plurality of road segments, wherein:
  - using one or more selected thresholds to filter the first plurality of road segments comprises filtering out road segments having assessments above a selected threshold indicative of severe damage;
- identifying, based on the sensor data, at least one road segment from the second plurality of road segments as a candidate for a selected type of maintenance, wherein:
  - the sensor data comprises an image of the at least one road segment; and
  - identifying the at least one road segment as a candidate for the selected type of maintenance comprises using at least one machine learning model to identify, from the image, one or more instances of physical damage exhibited by the at least one road segment; and
- constructing a candidate batch comprising road segments that are identified as candidates for the selected type of maintenance.

* * * * *

UNITED STATES PATENT AND TRADEMARK OFFICE
CERTIFICATE OF CORRECTION

Page 1 of 1

PATENT NO. : 12,475,375 B2
APPLICATION NO. : 17/769304
DATED : November 18, 2025
INVENTOR(S) : Miguel Dickson et al.

It is certified that error appears in the above-identified patent and that said Letters Patent is hereby corrected as shown below:

In the Specification

Column 1, Lines 6-15, RELATED APPLICATIONS section should read:
-- This application is a national stage filing under 35 U.S.C. § 371 of International Patent Application Serial No. PCT/US2020/055508, filed October 14, 2020, entitled "SYSTEMS AND METHODS FOR ASSESSING INFRASTRUCTURE", which claims priority benefit under 35 U.S.C. § 119(e) to U.S. Provisional Application No. 62/915,426, filed on October 15, 2019, entitled "SYSTEMS AND METHODS FOR ASSESSING INFRASTRUCTURE," bearing Attorney Docket No. R0829.70000US00. The contents of these applications are incorporated herein by reference in their entireties. --

In the Claims

At Column 29, Line 64:
"that the at least road segment"
Should read:
-- that the at least one road segment --

Signed and Sealed this
Twentieth Day of January, 2026

John A. Squires
*Director of the United States Patent and Trademark Office*